US009339930B2

(12) United States Patent
Niu

(10) Patent No.: US 9,339,930 B2
(45) Date of Patent: *May 17, 2016

(54) ROBOT, ROBOT CONTROL DEVICE, AND ROBOT SYSTEM

(71) Applicant: Seiko Epson Corporation, Tokyo (JP)

(72) Inventor: Akio Niu, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/195,925

(22) Filed: Mar. 4, 2014

(65) Prior Publication Data

US 2014/0309777 A1 Oct. 16, 2014

(30) Foreign Application Priority Data

Apr. 10, 2013 (JP) ................................. 2013-082276

(51) Int. Cl.
*B25J 9/06* (2006.01)
*B25J 9/16* (2006.01)
*B25J 13/08* (2006.01)

(52) U.S. Cl.
CPC *B25J 9/1651* (2013.01); *B25J 9/06* (2013.01); *B25J 13/088* (2013.01); *G05B 2219/37347* (2013.01); *G05B 2219/39195* (2013.01); *Y10T 74/20311* (2015.01); *Y10T 74/20329* (2015.01)

(58) Field of Classification Search
CPC ........ B25J 9/161; B25J 9/1615; B25J 9/1628; B25J 9/1638; B25J 9/1641; B25J 9/1651; B25J 9/1653; B25J 9/1694; B25J 13/088; G05B 2219/39195; G05B 2219/39199; G05B 2219/40549; G05B 2219/41128; G05B 19/404
See application file for complete search history.

(56) References Cited

U.S. PATENT DOCUMENTS

| 4,937,759 A | 6/1990 | Vold |
| 5,550,953 A | 8/1996 | Seraji |
| 5,710,870 A | 1/1998 | Ohm et al. |
| 5,781,705 A | 7/1998 | Endo |
| 5,944,476 A | 8/1999 | Bacchi et al. |

(Continued)

FOREIGN PATENT DOCUMENTS

| CN | 102501242 A | 6/2012 |
| EP | 2703130 A2 | 3/2014 |

(Continued)

OTHER PUBLICATIONS

"A3G4250D MEMS motion sensor: 3-axis digital output gyroscope," Feb. 2012, ST Microelectronics, Doc 022768 Rev 3.*

(Continued)

*Primary Examiner* — Spencer Patton
(74) *Attorney, Agent, or Firm* — Harness, Dickey & Pierce, P.L.C.

(57) ABSTRACT

A robot includes a base, a first arm rotatably connected to the base around a first rotating axis, a second arm rotatably connected to the first arm around a second rotating axis, a third arm rotatably connected to the second arm around a third rotating axis, a first angular velocity sensor provided in the first arm and having a first angular velocity detection axis parallel to the first rotating axis, a second angular velocity sensor provided in the second arm and having a second angular velocity detection axis parallel to the second rotating axis, and a third angular velocity sensor provided in the third arm and having a third angular velocity detection axis parallel to the third rotating axis.

19 Claims, 19 Drawing Sheets

(56) References Cited

U.S. PATENT DOCUMENTS

| | | |
|---|---|---|
| 6,216,056 B1 | 4/2001 | Ito et al. |
| 6,343,242 B1 | 1/2002 | Nomura et al. |
| 6,922,034 B2 | 7/2005 | Hirose |
| 7,202,442 B2 | 4/2007 | Nakagiri et al. |
| 7,233,872 B2 | 6/2007 | Shibasaki et al. |
| 7,756,606 B2 | 7/2010 | Nakajima et al. |
| 7,765,023 B2 | 7/2010 | Oaki et al. |
| 8,631,720 B2 | 1/2014 | Nakagiri et al. |
| 2003/0020461 A1 | 1/2003 | Nomura et al. |
| 2003/0178964 A1 | 9/2003 | Challoner |
| 2005/0113973 A1 | 5/2005 | Endo et al. |
| 2005/0166413 A1 | 8/2005 | Crampton |
| 2005/0240307 A1 | 10/2005 | Kuroki et al. |
| 2005/0246061 A1 | 11/2005 | Oaki et al. |
| 2007/0288124 A1 | 12/2007 | Nagata et al. |
| 2008/0246428 A1 | 10/2008 | Shimada |
| 2009/0149993 A1 | 6/2009 | Neki et al. |
| 2010/0113980 A1 | 5/2010 | Herr et al. |
| 2010/0256812 A1 | 10/2010 | Tsusaka et al. |
| 2010/0286823 A1 | 11/2010 | Neki et al. |
| 2010/0318223 A1* | 12/2010 | Motoyoshi et al. ........... 700/253 |
| 2011/0004343 A1* | 1/2011 | Iida ................................. 700/253 |
| 2011/0082566 A1 | 4/2011 | Herr et al. |
| 2011/0107866 A1 | 5/2011 | Oka et al. |
| 2011/0257785 A1 | 10/2011 | Nihei et al. |
| 2012/0126664 A1* | 5/2012 | Ogura et al. ................... 310/312 |
| 2012/0215356 A1 | 8/2012 | Igarashi et al. |
| 2012/0215357 A1 | 8/2012 | Igarashi et al. |
| 2012/0272774 A1 | 11/2012 | Kirihara et al. |
| 2012/0296471 A1 | 11/2012 | Inaba et al. |
| 2013/0073086 A1 | 3/2013 | Motoyoshi et al. |
| 2013/0079929 A1* | 3/2013 | Lim et al. ....................... 700/250 |

FOREIGN PATENT DOCUMENTS

| | | |
|---|---|---|
| EP | 2703131 A2 | 3/2014 |
| JP | 2011-136395 A | 7/2011 |
| WO | WO-2010-019310 A1 | 2/2010 |

OTHER PUBLICATIONS

Wilcoxon Research, "Vibration sensor wiring and cabling," Aug. 2008.*
Analog Devices, "ADIS16120," 2007, Rev. B.*
Extended European Search Report for Application No. EP 14162332.2 dated Feb. 4, 2016 (9 pages).
Extended European Search Report for Application No. EP 13182172.0 dated Feb. 11, 2016 (7 pages).

* cited by examiner

ROBOT, ROBOT CONTROL DEVICE, AND ROBOT SYSTEM

BACKGROUND

1. Technical Field

The present invention relates to a robot, a robot control device, and a robot system.

2. Related Art

In a robot described in JP-A-2011-136395, a six-axis sensor which detects accelerations in the directions of an X axis, a Y axis, and a Z axis orthogonal to each other and accelerations around the X axis, the Y axis, and the Z axis is provided in a front end portion, that is, a sixth link on a front-most end side. A vibrational component of angular velocity around an intended axis is obtained for each link on the basis of the detection result of the six-axis sensor. As such, control for suppressing vibration is performed. The vibrational component of the angular velocity of the link is called "torsional angular velocity", "vibrational angular velocity", or the like.

In the robot described in JP-A-2011-136395, since the posture of the six-axis sensor changes with the motion of the robot, it is necessary to perform coordinate axis transformation or the like, called Jacobi's transformation, from the detection result of the six-axis sensor, and to obtain the vibrational component of the angular velocity of each link. Moreover, it is necessary to perform computation in conformity with the rotation angle of a motor which changes every moment.

Since complicated and enormous computation processing is required, there is a problem in that a control device which has a high-performance and an expensive CPU (Central Processing Unit) or the like is required. This causes an increase in cost.

Also, since the complicated and enormous computation processing is required, there is a problem in that a computation error is likely to occur. If such an error occurs, it is not possible to sufficiently suppress vibration due to the computation error.

SUMMARY

An advantage of some aspects of the invention is that it provides a robot, a robot control device, and a robot system capable of suppressing vibration easily and reliably.

An aspect of the invention is directed to a robot including a base, a first arm which is connected to the base rotatably around a first rotating axis as a rotation center, a second arm which is connected to the first arm rotatably around a second rotating axis, which is an axis orthogonal to the first rotating axis or an axis parallel to the axis orthogonal to the first rotating axis, as a rotation center, a third arm which is connected to the second arm rotatably around a third rotating axis, which is an axis parallel to the second rotating axis, as a rotation center, a first angular velocity sensor which is provided in the first arm and in which an angular velocity detection axis is parallel to the first rotating axis, a second angular velocity sensor which is provided in the second arm and in which an angular velocity detection axis is parallel to the second rotating axis, and a third angular velocity sensor which is provided in the third arm and in which an angular velocity detection axis is parallel to the third rotating axis.

With this configuration, it is possible to suppress vibration easily and reliably.

That is, first, the angular velocity of the first arm can be detected by the first angular velocity sensor. The angular velocity of the second arm can be detected by the second angular velocity sensor. The angular velocity of the third arm can be detected by the third angular velocity sensor. Then, it is possible to suppress vibration on the basis of these detection results.

Even if the posture of the robot changes, the detection axis of the angular velocity of the first angular velocity sensor is constant. For this reason, it is not necessary to correct the angular velocity of the first arm detected by the first angular velocity sensor with the direction of the first angular velocity sensor.

Since the second rotating axis is orthogonal to the first rotating axis or is parallel to an axis orthogonal to the first rotating axis, even if the posture of the robot changes, for example, even if the first arm rotates, the detection axis of the angular velocity of the second angular velocity sensor is constant. For this reason, it is not necessary to correct the angular velocity of the second arm detected by the second angular velocity sensor with the direction of the second angular velocity sensor.

Since the third rotating axis is orthogonal to the first rotating axis or is parallel to an axis orthogonal to the first rotating axis and is parallel to the second rotating axis, even if the posture of the robot changes, for example, even if the first arm rotates or the second arm rotates, the detection axis of the angular velocity of the third angular velocity sensor is constant. For this reason, it is not necessary to correct the angular velocity of the third arm detected by the third angular velocity sensor with the direction of the third angular velocity sensor.

Accordingly, complicated and enormous computation is not required. Therefore, a computation error is less likely to occur, and it is possible to reliably suppress vibration and to increase a response speed in the control of the robot.

By communizing (matching or making all the same) the first, second, and third angular velocity sensors, it is possible to reduce cost.

It is preferable that the robot according to the aspect of the invention further includes a first angular velocity sensor unit having a first housing, and the first angular velocity sensor and a circuit unit which are provided in the first housing, the circuit unit AD converting and transmitting a signal output from the first angular velocity sensor, a second angular velocity sensor unit having a second housing, and the second angular velocity sensor and a circuit unit which are provided in the second housing, the circuit unit AD converting and transmitting a signal output from the second angular velocity sensor, and a third angular velocity sensor unit having a third housing, and the third angular velocity sensor and a circuit unit which are provided in the third housing, the circuit unit AD converting and transmitting a signal output from the third angular velocity sensor, in which the first angular velocity sensor unit is provided in the first arm, the second angular velocity sensor unit is provided in the second arm, and the third angular velocity sensor unit is provided in the third arm.

With this configuration, it is possible to simplify the configuration compared to a case where the circuit unit is provided separately.

In the robot according to the aspect of the invention, it is preferable that the appearance of each of the first housing, the second housing, and the third housing is a rectangular parallelepiped, the detection axis of the angular velocity of the first angular velocity sensor matches (is aligned with) the normal to the largest surface of the rectangular parallelepiped of the first housing, the detection axis of the angular velocity of the second angular velocity sensor matches (is aligned with) the normal of the largest surface of the rectangular parallelepiped of the second housing, and the detection axis of the angular velocity of the third angular velocity sensor matches (is aligned with) the normal to the largest surface of the rectangular parallelepiped of the third housing.

With this configuration, it is possible to allow the directions of the detection axis of the angular velocity of the first angular velocity sensor, the detection axis of the angular velocity of the second angular velocity sensor, and the detection axis of the angular velocity of the third angular velocity sensor to be recognized easily and reliably, and to allow the first angular velocity sensor, the second angular velocity sensor, and the third angular velocity sensor to take an appropriate posture easily.

In the robot according to the aspect of the invention, it is preferable that each of the first angular velocity sensor, the second angular velocity sensor, and the third angular velocity sensor has a gyro element, and when two orthogonal axes are set as a first axis and a second axis, the gyro element has a base portion, a pair of detection vibrating arms which extend from the base portion in parallel with the first axis and in opposite directions, a pair of connecting arms which extend from the base portion in parallel with the second axis and in opposite directions, and a pair of driving vibrating arms which extend from the front end portions or the middle of the respective connecting arms in parallel with the first axis and in opposite directions.

With this configuration, the first angular velocity sensor, the second angular velocity sensor, and the third angular velocity sensor are compact and have high detection precision.

In the robot according to the aspect of the invention, it is preferable that the first housing has an attachment portion to be attached to the first arm in a corner portion of the first housing, the second housing has an attachment portion to be attached to the second arm in a corner portion of the second housing, and the third housing has an attachment portion to be attached to the third arm in a corner portion of the third housing.

With this configuration, it is possible to attach the first angular velocity sensor unit to the first arm reliably, to attach the second angular velocity sensor unit to the second arm reliably, and to attach the third angular velocity sensor unit to the third arm reliably.

It is preferable that the robot according to the aspect of the invention further includes a fixing member which is conductive and fixes the attachment portion of the first housing to the first arm, the circuit unit of the first angular velocity sensor unit being grounded to the first arm by the fixing member, a fixing member which is conductive and fixes the attachment portion of the second housing to the second arm, the circuit unit of the second angular velocity sensor unit being grounded to the second arm by the fixing member, and a fixing member which is conductive and fixes the attachment portion of the third housing to the third arm, the circuit unit of the third angular velocity sensor unit being grounded to the third arm by the fixing member.

With this configuration, it is possible to reduce the number of components and to simplify the configuration.

In the robot according to the aspect of the invention, it is preferable that the first arm has a housing and an arm-side attachment portion formed integrally with the housing, and the first angular velocity sensor unit is attached directly to the arm-side attachment portion.

With this configuration, it is possible to allow the first angular velocity sensor unit to rotate integrally with the first arm reliably.

In the robot according to the aspect of the invention, it is preferable that the second arm has a housing and an arm-side attachment portion formed integrally with the housing, and the second angular velocity sensor unit is attached directly to the arm-side attachment portion.

With this configuration, it is possible to allow the second angular velocity sensor unit to rotate integrally with the second arm reliably.

In the robot according to the aspect of the invention, it is preferable that the third arm has a housing and an arm-side attachment portion formed integrally with the housing, and the third angular velocity sensor unit is attached directly to the arm-side attachment portion.

With this configuration, it is possible to allow the third angular velocity sensor unit to rotate integrally with the third arm reliably.

It is preferable that the robot according to the aspect of the invention further includes a cable which is provided in the first arm and supplies power to the robot, in which the first angular velocity sensor is arranged in an end portion of the first arm opposite to the cable.

With this configuration, it is possible to prevent the first angular velocity sensor from being affected by noise from the cable, and to prevent a circuit or a wiring on the first angular velocity sensor side from being short-circuited by the cable.

It is preferable that the robot according to the aspect of the invention further includes a cable which is provided in the second arm and supplies power to the robot, in which the second angular velocity sensor is arranged in an end portion of the second arm opposite to the cable.

With this configuration, it is possible to prevent the second angular velocity sensor from being affected by noise from the cable, and to prevent a circuit or a wiring on the second angular velocity sensor side from being short-circuited by the cable.

It is preferable that the robot according to the aspect of the invention further includes a cable which is provided in the third arm and supplies power to the robot, in which the third angular velocity sensor is arranged in an end portion of the third arm on an opposite side to the cable.

With this configuration, it is possible to prevent the third angular velocity sensor from being affected by noise from the cable, and to prevent a circuit or a wiring on the third angular velocity sensor side from being short-circuited by the cable.

It is preferable that the robot according to the aspect of the invention further includes a fourth arm which is connected to the third arm rotatably around a fourth rotating axis, which is an axis orthogonal to the third rotating axis or an axis parallel to the axis orthogonal to the third rotating axis, as a rotation center, a fifth arm which is connected to the fourth arm rotatably around a fifth rotating axis, which is an axis orthogonal to the fourth rotating axis or an axis parallel to the axis orthogonal to the fourth rotating axis, as a rotation center, and a sixth arm which is connected to the fifth arm rotatably around a sixth rotating axis, which is an axis orthogonal to the fifth rotating axis or an axis parallel to the axis orthogonal to the fifth rotating axis, as a rotation center.

With this configuration, a more complicated motion can be easily performed.

In the robot according to the aspect of the invention, it is preferable that the first rotating axis matches (is aligned with) the normal to an installation surface of the base.

With this configuration, it is possible to easily control the robot.

Another aspect of the invention is directed to a robot control device which controls the actuation of a robot, in which the robot includes a base, a first arm which is connected to the base rotatably around a first rotating axis as a rotation center, a second arm which is connected to the first arm rotatably around a second rotating axis, which is an axis orthogonal to the first rotating axis or an axis parallel to the axis orthogonal to the first rotating axis, as a rotation center, and a third arm which is connected to the second arm rotatably around a third rotating axis, which is an axis parallel to the second rotating axis, as a rotation center, and the robot control device includes a receiving unit which receives a first signal output from a first angular velocity sensor provided in the first arm with an angular velocity detection axis parallel to the first rotating axis, a second signal output from a second angular velocity sensor provided in the second arm with an angular velocity detection axis parallel to the second rotating axis, and a third signal output from a third angular velocity sensor provided in the third arm with an angular velocity detection axis parallel to the third rotating axis, a calculation unit which obtains a vibrational component of the angular velocity of the first arm, a vibrational component of the angular velocity of the second arm, and a vibrational component of the angular velocity of the third arm on the basis of the first signal, second signal, and the third signal received by the receiving unit, and a control unit which controls the actuation of the robot on the basis of the vibrational component of the angular velocity of the first arm, the vibrational component of the angular velocity of the second arm, and the vibrational component of the angular velocity of the third arm obtained by the calculation unit.

With this configuration, it is possible to suppress vibration easily and reliably.

That is, first, the vibrational component of the angular velocity of the first arm can be obtained by the calculation unit on the basis of the angular velocity of the first arm detected by the first angular velocity sensor. The vibrational component of the angular velocity of the second arm detected by the second angular velocity sensor can be obtained by the calculation unit. The vibrational component of the angular velocity of the third arm detected by the third angular velocity sensor can be obtained by the calculation unit. Then, it is possible to suppress vibration on the basis of the vibrational component of the angular velocity of the first arm, the vibrational component of the angular velocity of the second arm, and the vibrational component of the angular velocity of the third arm.

Even if the posture of the robot changes, the detection axis of the angular velocity of the first angular velocity sensor is constant. For this reason, it is not necessary to correct the angular velocity of the first arm detected by the first angular velocity sensor with the direction of the first angular velocity sensor.

Since the second rotating axis is orthogonal to the first rotating axis or is parallel to an axis orthogonal to the first rotating axis, even if the posture of the robot changes, for example, even if the first arm rotates, the detection axis of the angular velocity of the second angular velocity sensor is constant. For this reason, it is not necessary to correct the angular velocity of the second arm detected by the second angular velocity sensor with the direction of the second angular velocity sensor.

Since the third rotating axis is orthogonal to the first rotating axis or is parallel to an axis orthogonal to the first rotating axis and is parallel to the second rotating axis, even if the posture of the robot changes, for example, even if the first arm rotates or the second arm rotates, the detection axis of the angular velocity of the third angular velocity sensor is constant. For this reason, it is not necessary to correct the angular velocity of the third arm detected by the third angular velocity sensor with the direction of the third angular velocity sensor.

Accordingly, complicated and enormous computation is not required. Therefore, a computation error is less likely to occur, and it is possible to reliably suppress vibration and to increase a response speed in the control of the robot.

Still another aspect of the invention is directed to a robot system including the robot according to the aspect of the invention, and a robot control device which controls the actuation of the robot.

With this configuration, it is possible to suppress vibration easily and reliably.

That is, first, the angular velocity of the first arm can be detected by the first angular velocity sensor. The angular velocity of the second arm can be detected by the second angular velocity sensor. The angular velocity of the third arm can be detected by the third angular velocity sensor. Then, it is possible to suppress vibration on the basis of these detection results.

Even if the posture of the robot changes, the detection axis of the angular velocity of the first angular velocity sensor is constant. For this reason, it is not necessary to correct the angular velocity of the first arm detected by the first angular velocity sensor with the direction of the first angular velocity sensor.

Since the second rotating axis is orthogonal to the first rotating axis or is parallel to an axis orthogonal to the first rotating axis, even if the posture of the robot changes, for example, even if the first arm rotates, the detection axis of the angular velocity of the second angular velocity sensor is constant. For this reason, it is not necessary to correct the angular velocity of the second arm detected by the second angular velocity sensor with the direction of the second angular velocity sensor.

Since the third rotating axis is orthogonal to the first rotating axis or is parallel to an axis orthogonal to the first rotating axis and is parallel to the second rotating axis, even if the posture of the robot changes, for example, even if the first arm rotates or the second arm rotates, the detection axis of the angular velocity of the third angular velocity sensor is constant. For this reason, it is not necessary to correct the angular velocity of the third arm detected by the third angular velocity sensor with the direction of the third angular velocity sensor.

Accordingly, complicated and enormous computation is not required. Therefore, a computation error is less likely to occur, and it is possible to reliably suppress vibration and to increase a response speed in the control of the robot.

By communizing the first, second, and third angular velocity sensors, it is possible to reduce cost.

BRIEF DESCRIPTION OF THE DRAWINGS

Embodiments of the invention will be described with reference to the accompanying drawings, wherein like numbers reference like elements.

DESCRIPTION OF EXEMPLARY EMBODIMENTS

Hereinafter, a robot, a robot control device, and a robot system according to the invention will be described in detail on the basis of a preferred embodiment shown in the accompanying drawings.

Figure 1:
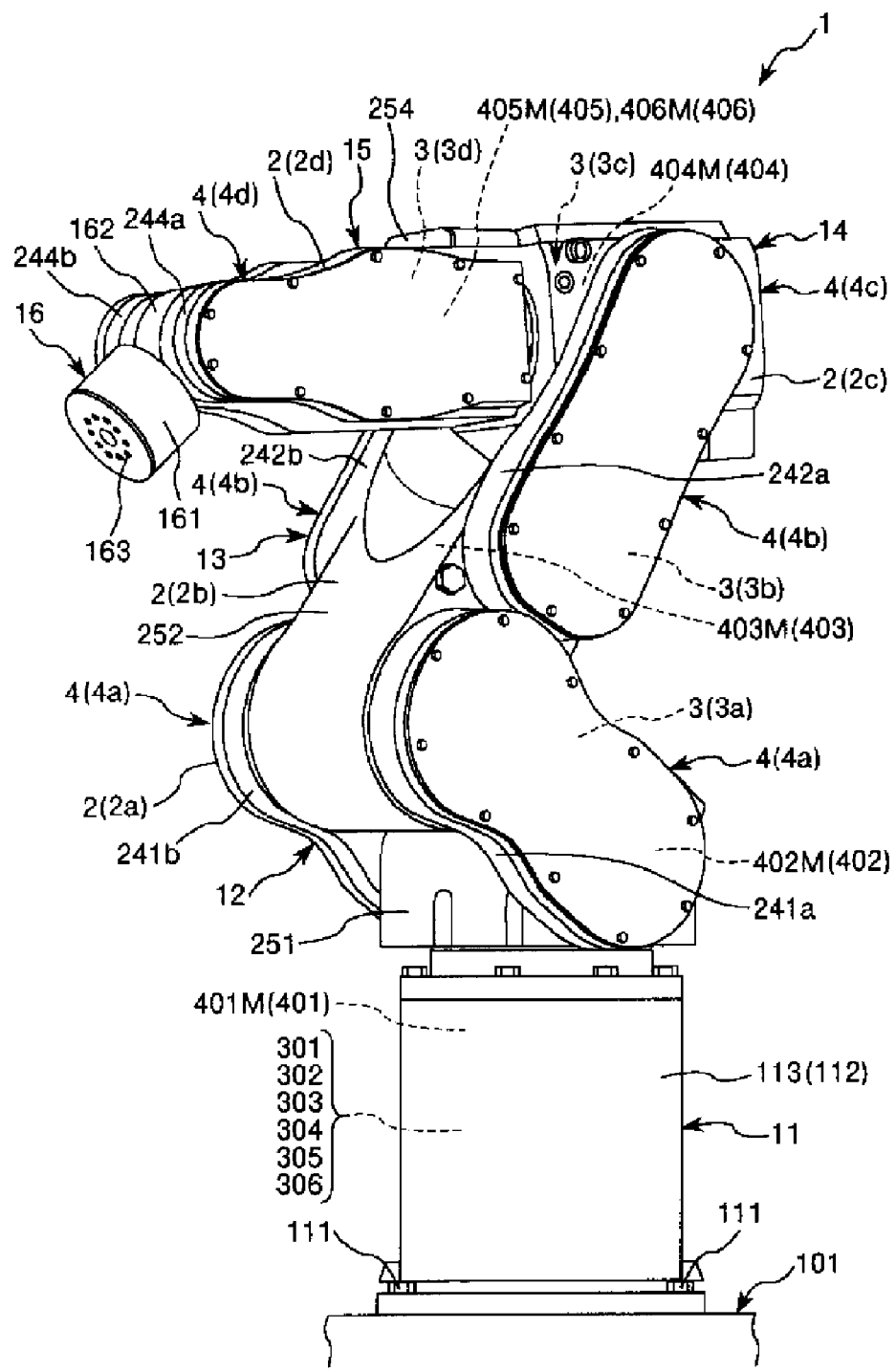
FIG. 1 is a perspective view when a robot according to an embodiment of the invention is viewed from a front side.
Figure 2:
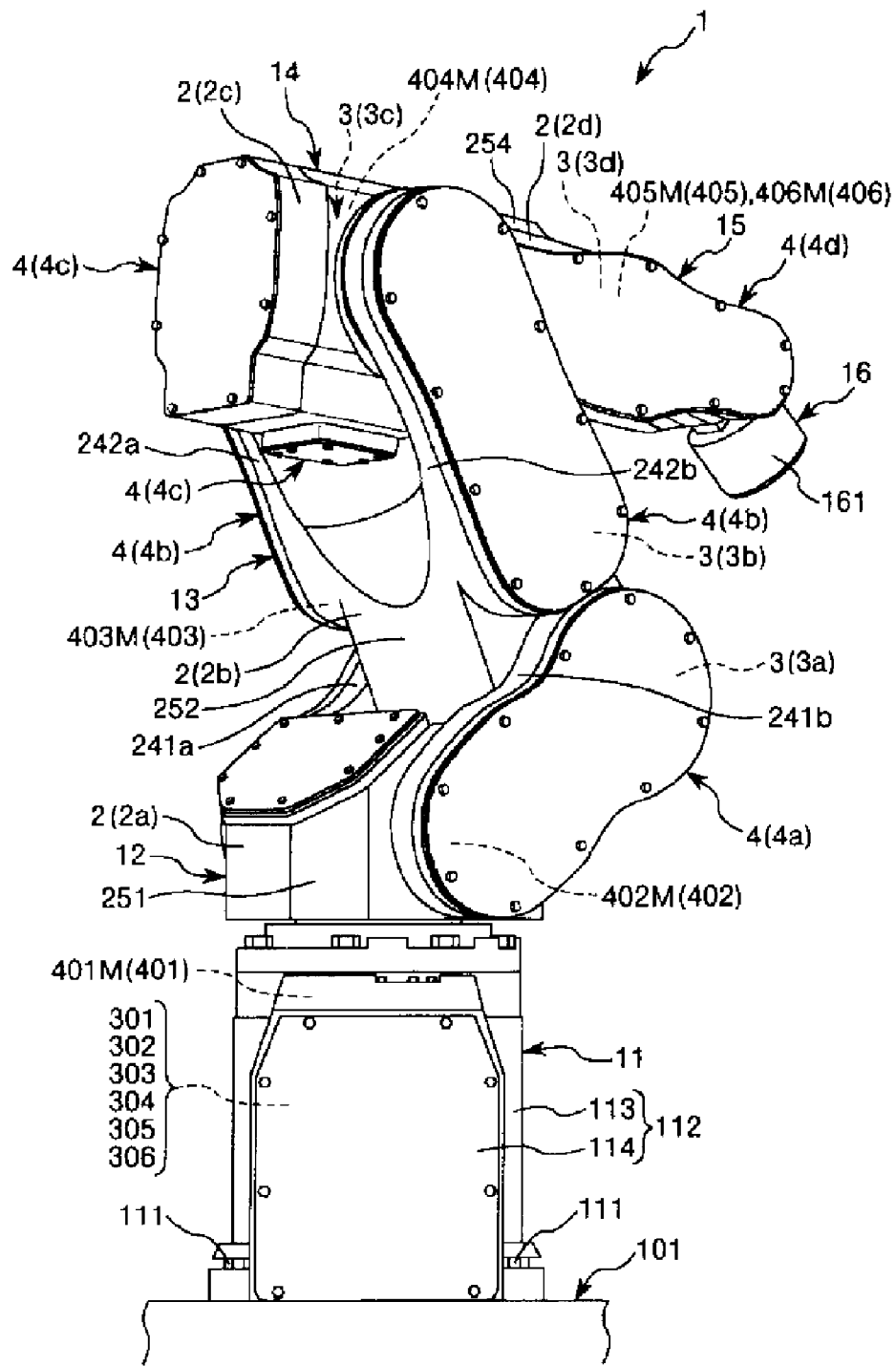
FIG. 2 is a perspective view when the robot shown in FIG. 1 is viewed from a rear side.
Figure 3:
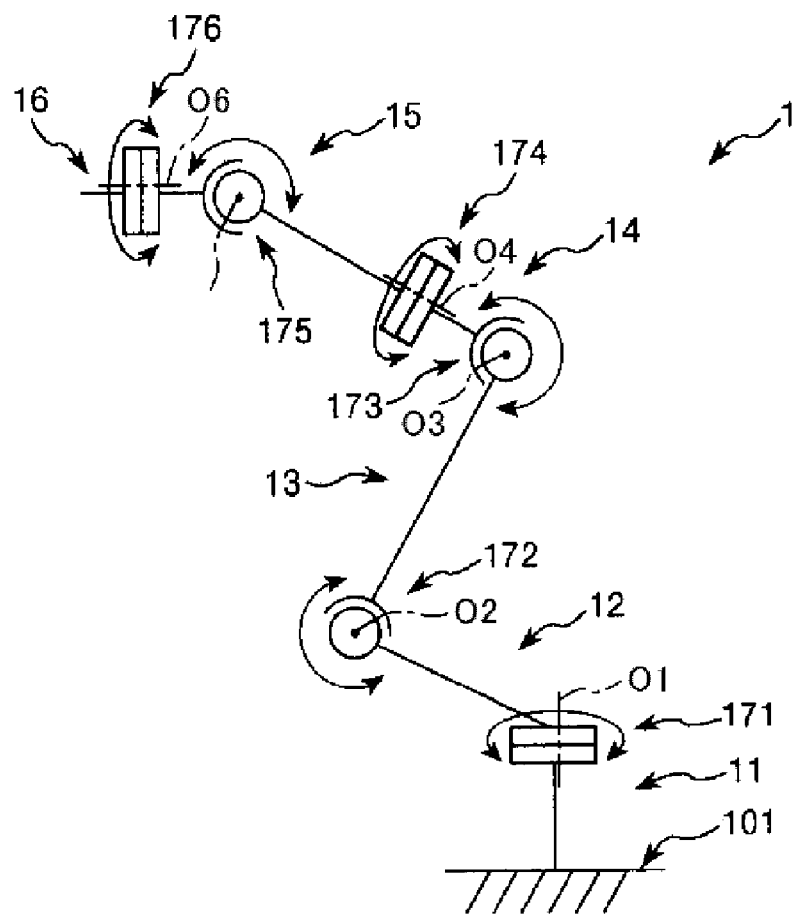
FIG. 3 is a schematic view of the robot shown in FIG. 1.
Figure 4:
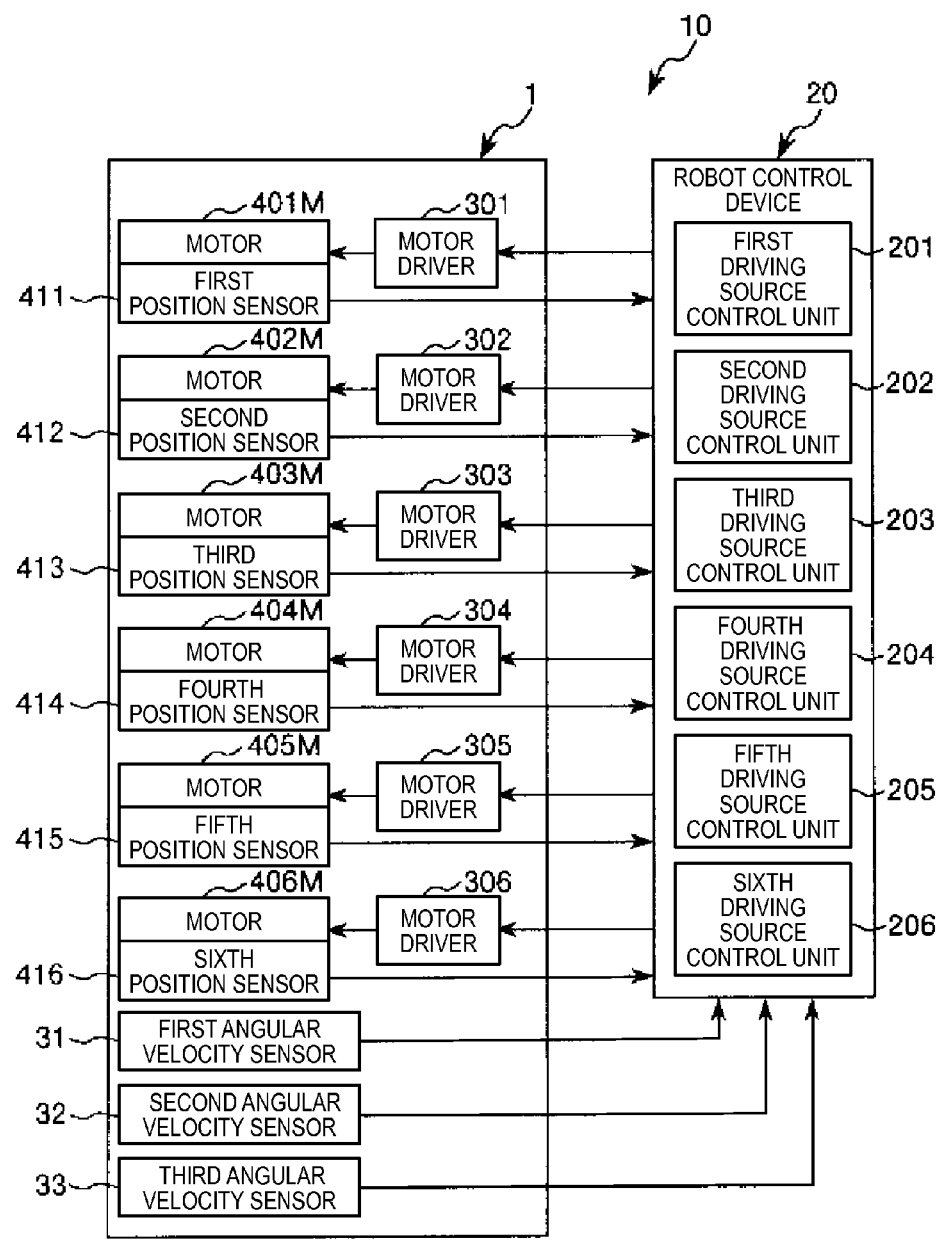
FIG. 4 is a block diagram of a part of a robot system having the robot shown in FIG. 1.
Figure 5:
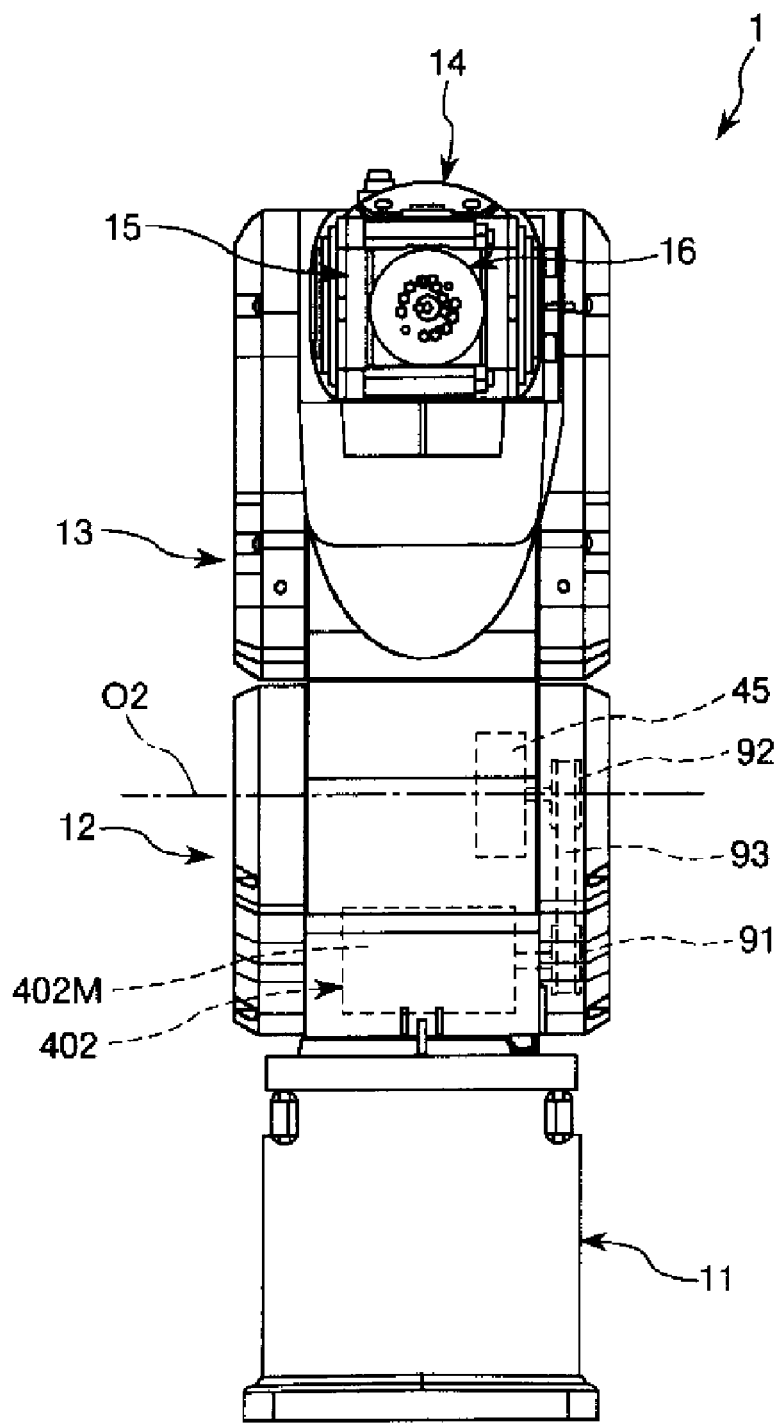
FIG. 5 is a front view of the robot shown in FIG. 1.
Figure 6:
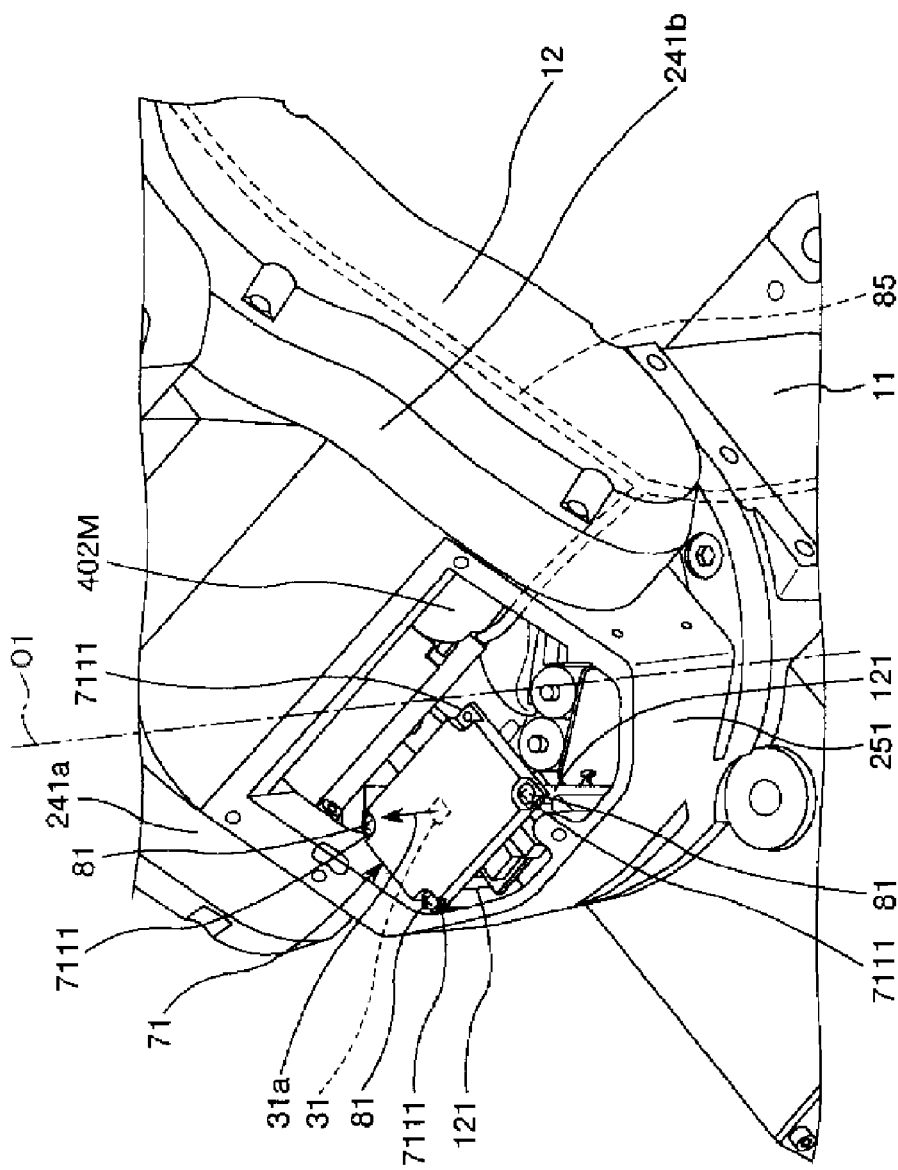
FIG. 6 is a diagram showing the vicinity of a first angular velocity sensor in a first arm of the robot shown in FIG. 1.
Figure 7:
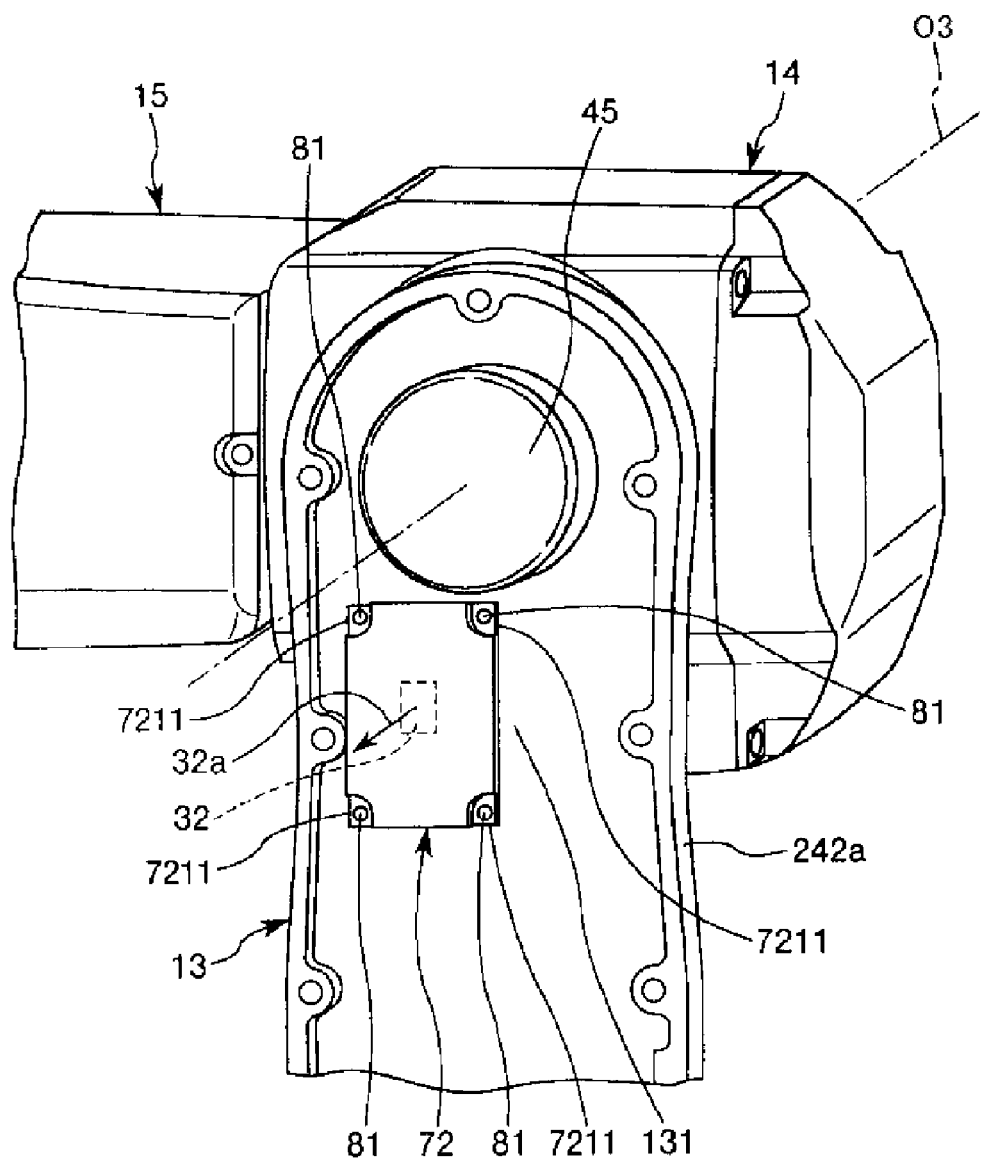
FIG. 7 is a diagram showing the vicinity of a second angular velocity sensor in a second arm of the robot shown in FIG. 1.
Figure 8:
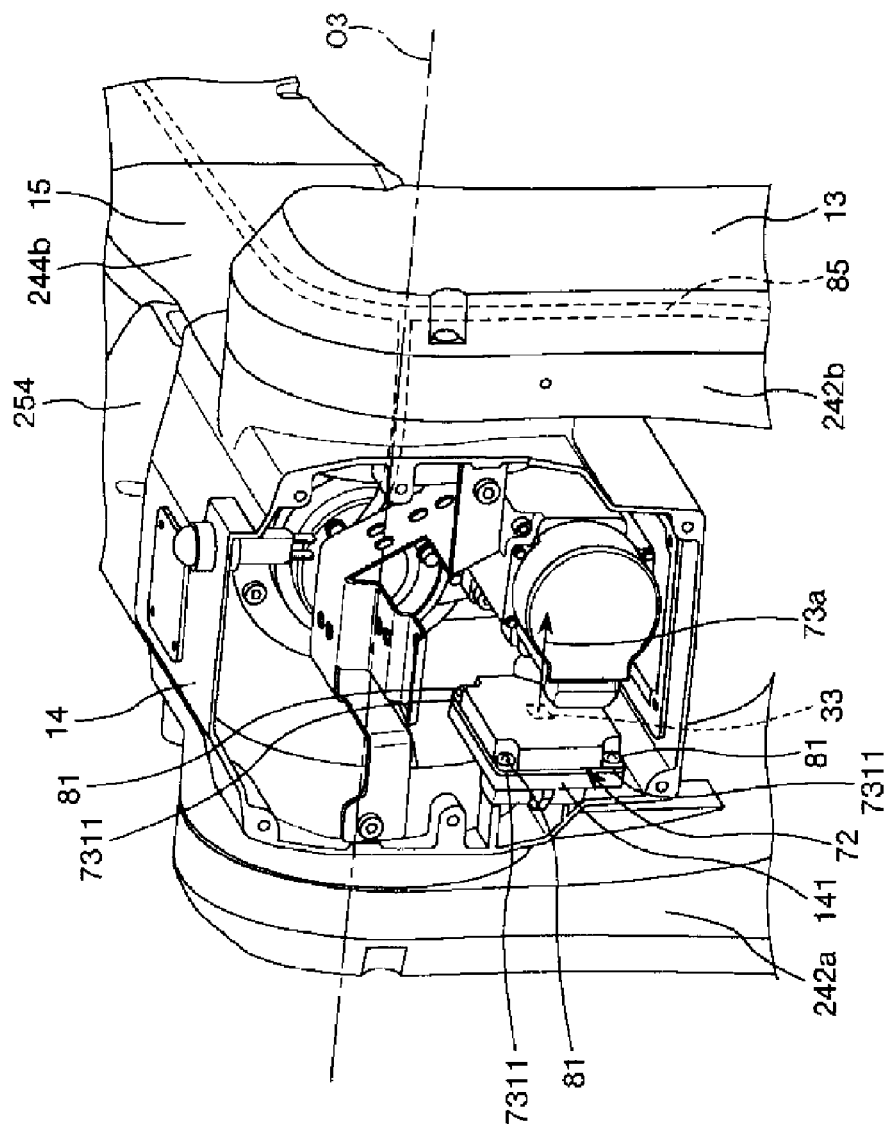
FIG. 8 is a diagram showing the vicinity of a third angular velocity sensor in a third arm of the robot shown in FIG. 1.
Figure 9:
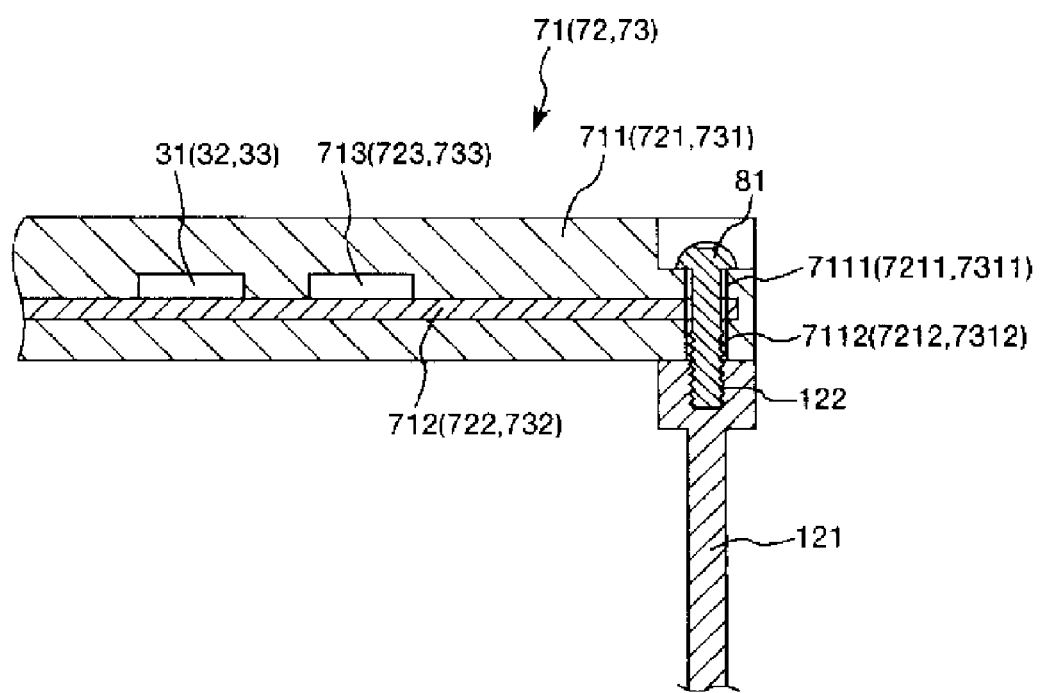
FIG. 9 is a sectional view of a first angular velocity sensor unit of the robot shown in FIG. 1.
Figure 10:
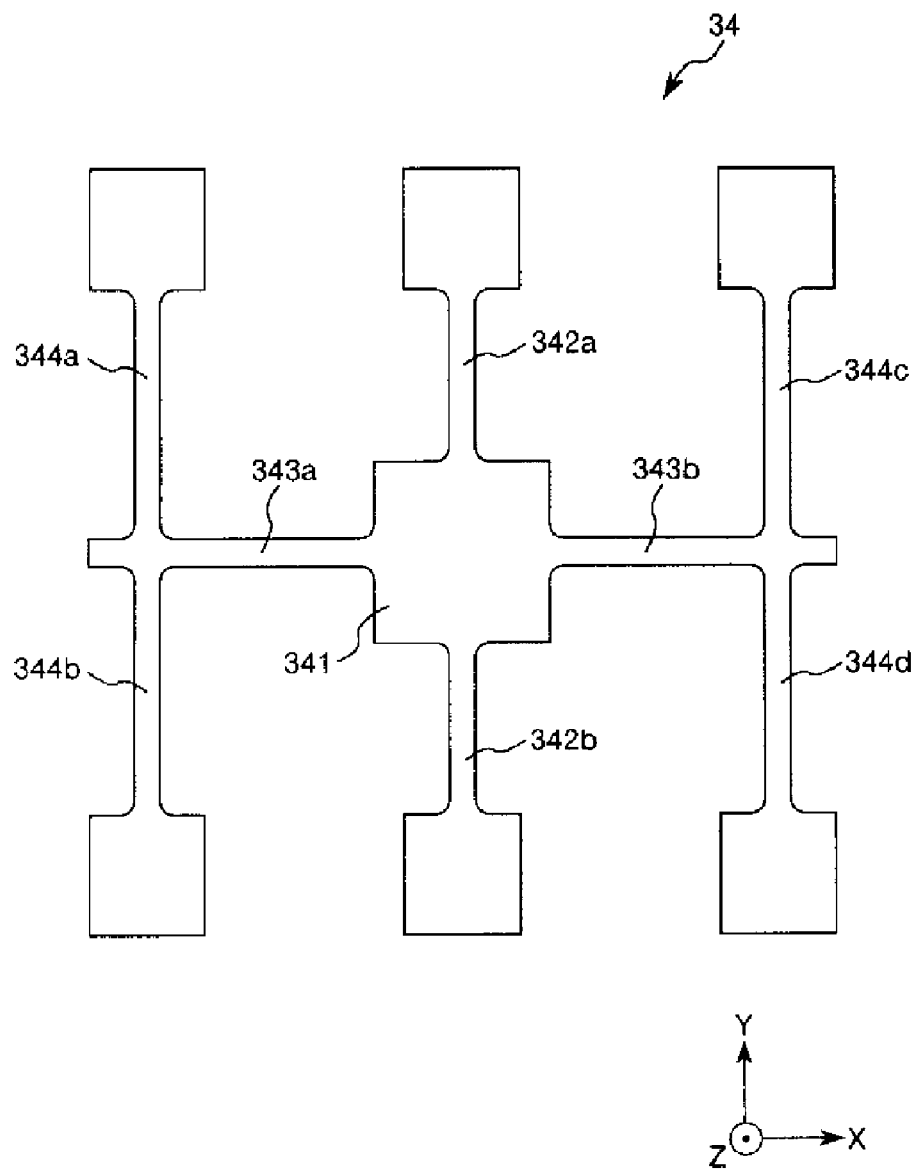
FIG. 10 is a plan view of a gyro element in an angular velocity sensor.
Figure 11A:
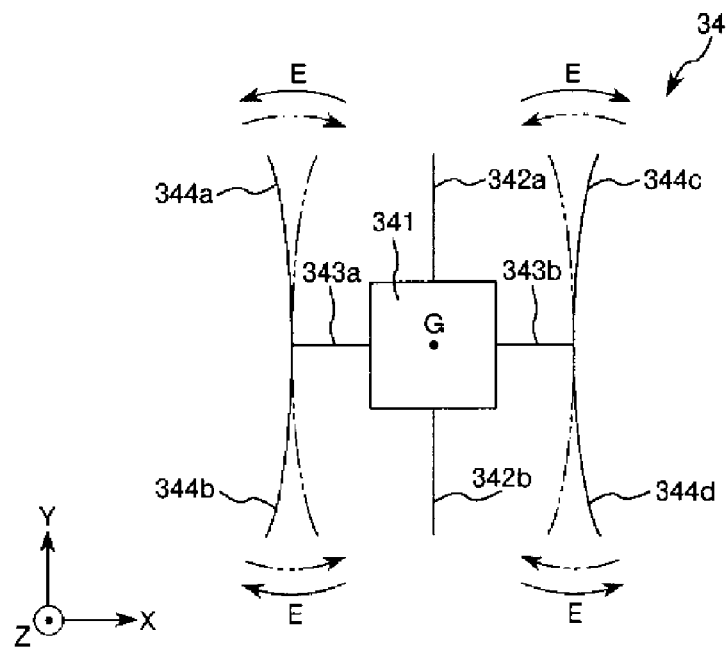
FIGS. 11A and 11B are diagrams showing the actuation of the gyro element shown in FIG. 10.
Figure 11B:
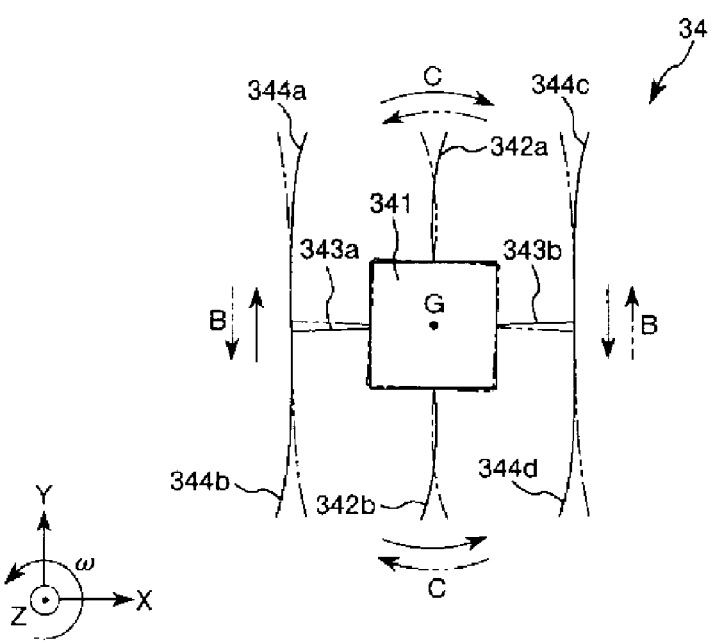
Figure 17:
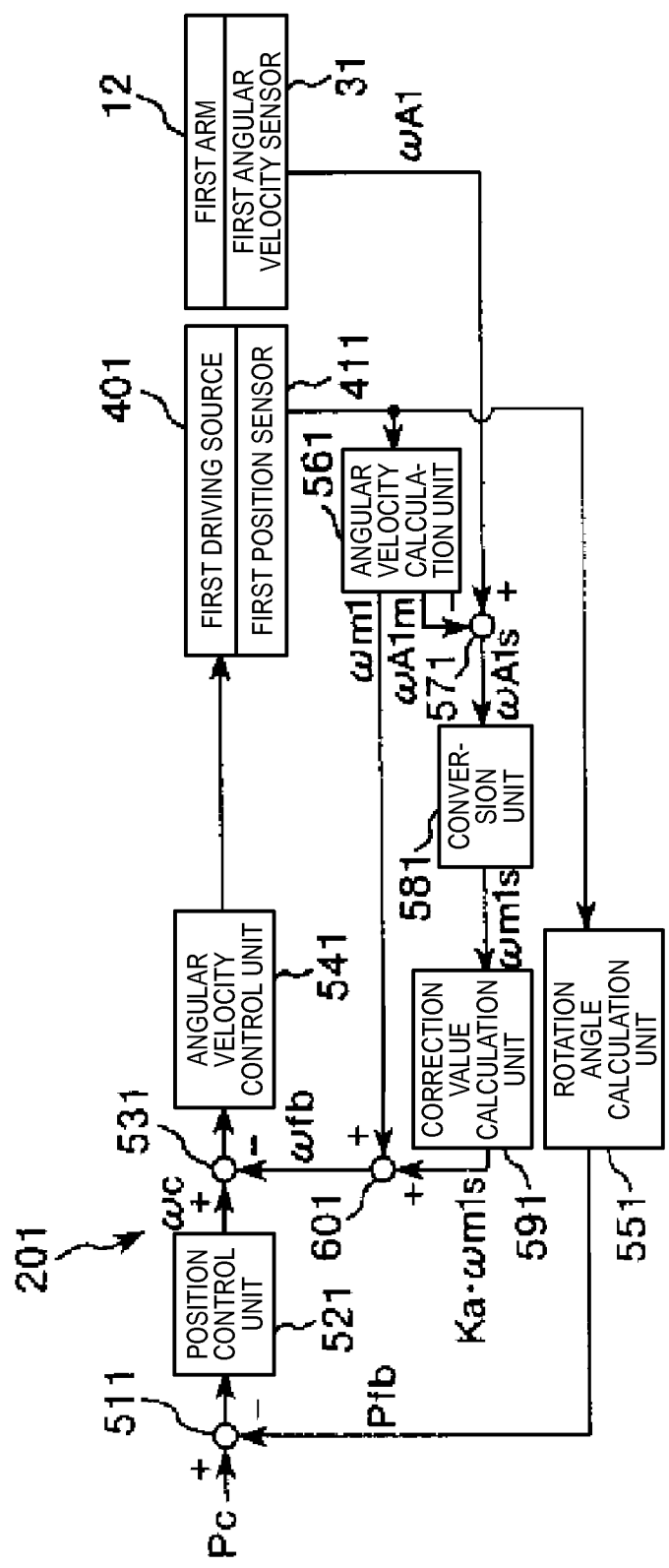
FIG. 17 is a block diagram of a part of a modification example of the robot shown in FIG. 1.
Figure 18:
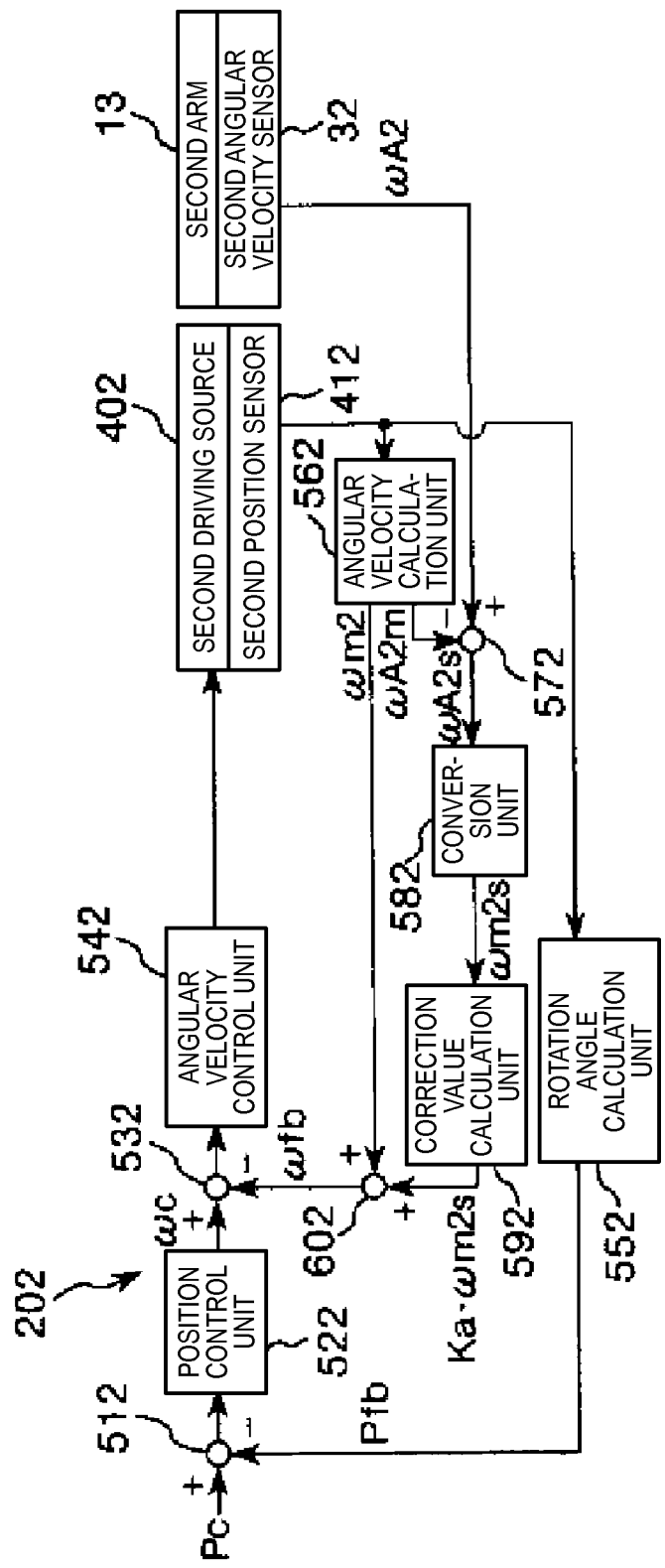
FIG. 18 is a block diagram of a part of a modification example of the robot shown in FIG. 1.
Figure 19:
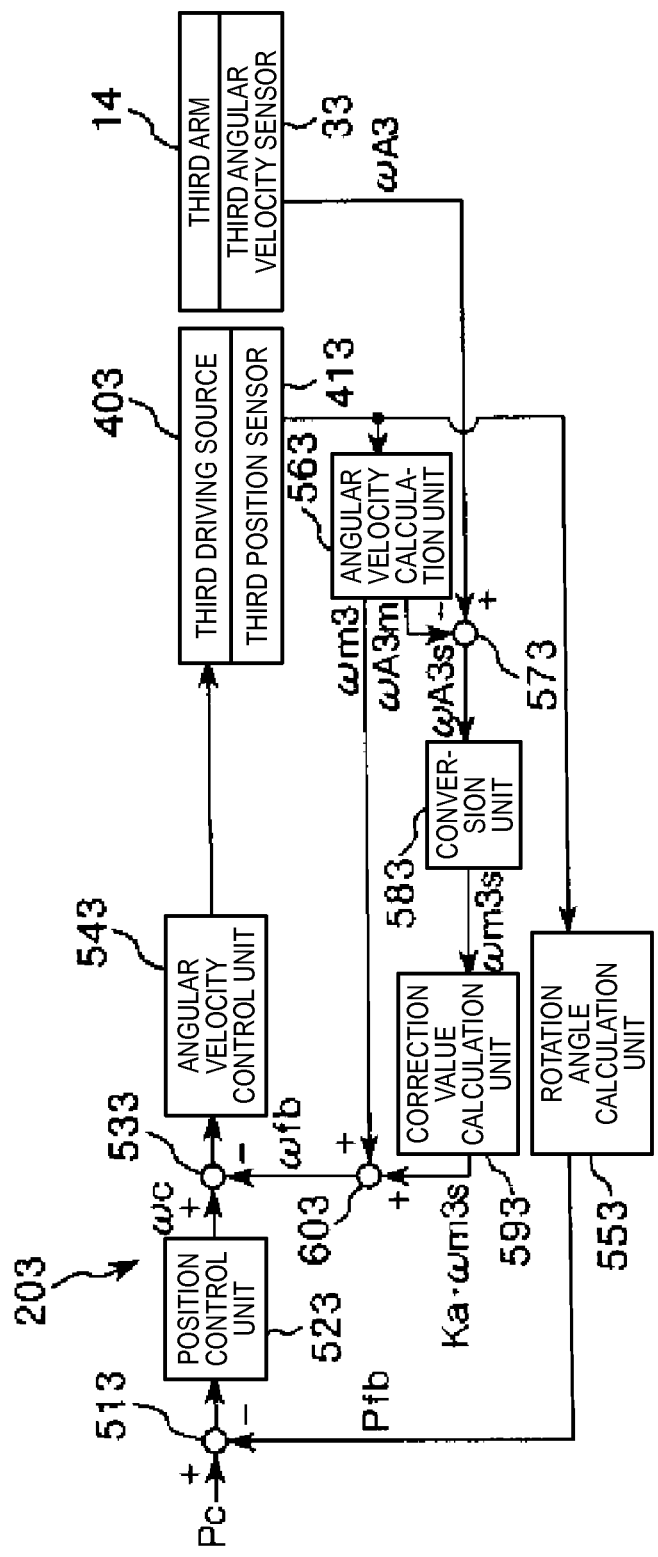
FIG. 19 is a block diagram of a main of a modification example of the robot shown in FIG. 1.

FIG. 1 is a perspective view when a robot according to an embodiment of the invention is viewed from a front side. FIG. 2 is a perspective view when the robot shown in FIG. 1 is viewed from a rear side. FIG. 3 is a schematic view of the robot shown in FIG. 1. FIG. 4 is a block diagram of a part of a robot system having the robot shown in FIG. 1. FIG. 5 is a front view of the robot shown in FIG. 1. FIG. 6 is a diagram showing the vicinity of a first angular velocity sensor in a first arm of the robot shown in FIG. 1. FIG. 7 is a diagram showing the vicinity of a second angular velocity sensor in a second arm of the robot shown in FIG. 1. FIG. 8 is a diagram showing the vicinity of a third angular velocity sensor in a third arm of the robot shown in FIG. 1. FIG. 9 is a sectional view of a first angular velocity sensor unit of the robot shown in FIG. 1. FIG. 10 is a plan view of a gyro element in an angular velocity sensor. FIGS. 11A and 11B are diagrams showing the actuation of the gyro element shown in FIG. 10. FIGS. 12 to 16 are block diagrams of a part of the robot shown in FIG. 1. FIGS. 17 to 19 are block diagrams of a part of a modification example of the robot shown in FIG. 1.

Hereinafter, for convenience of description, the upper side in FIGS. 1 to 3 and 5 to 8 is referred to as "up" or "upward", and the lower side is referred to as "down" or "downward". The base side in FIGS. 1 to 3 and 5 to 8 is referred to as "base end", and the opposite side is referred to as "front end". In FIG. 9, reference numerals of the respective units of a second angular velocity sensor unit and a third angular velocity sensor unit are written in parentheses corresponding to a first angular velocity sensor unit, and diagrams of the second angular velocity sensor unit and the third angular velocity sensor unit are omitted.

A robot system (industrial robot system) 10 shown in FIGS. 1 to 4 can be used in, for example, a manufacturing process for manufacturing precision equipment, such as a wristwatch, and has a robot (industrial robot) 1, and a robot control device (control unit) 20 (see FIG. 4) which controls the actuation of the robot 1. The robot 1 and the robot control device 20 are electrically connected together. The robot control device 20 can be constituted by, for example, a personal computer (PC) embedded with a CPU (Central Processing Unit) or the like. The robot control device 20 will be described below in detail.

The robot 1 includes a base 11, four arms (links) 12, 13, 14, and 15, a wrist (link) 16, and six driving sources 401, 402, 403, 404, 405, and 406. The robot 1 is a vertical articulated (six-axis) robot (robot body) in which the base 11, the arms 12, 13, 14, and 15, and the wrist 16 are connected in this order from the base end to the front end. In the vertical articulated robot, the base 11, the arms 12 to 15, and the wrist 16 may be collectively referred to as "arm", the arm 12 may be referred to as a "first arm", the arm 13 may be referred to as a "second arm", the arm 14 may be referred to as a "third arm", the arm 15 may be referred to as a "fourth arm", and the wrist 16 may be referred to as "fifth arm and sixth arm", separately. In this embodiment, the wrist 16 has the fifth arm and the sixth arm. An end effector or the like can be attached to the wrist 16.

The arms 12 to 15 and the wrist 16 are supported to be separately displaceable with respect to the base 11. Although the length of each of the arms 12 to 15 and the wrist is not particularly limited, and in the illustrated configuration, the length of each of the first arm 12, the second arm 13, and the fourth arm 15 is set to be longer than the third arm 14 and the wrist 16.

The base 11 and the first arm 12 are connected together through a joint 171. The first arm 12 has a first rotating axis O1 parallel to a vertical direction as a rotation center with respect to the base 11, and is rotatable around the first rotating axis O1. The first rotating axis O1 matches (is aligned with) the normal to a top surface of a floor 101 which is an installation surface of the base 11. The rotation around the first rotating axis O1 is performed by driving of the first driving source 401 having a motor 401M. The first driving source 401 is driven by the motor 401M and a cable (not shown), and the motor 401M is controlled by the robot control device 20 through a motor driver 301 electrically connected to the motor 401M (see FIG. 4). Although the first driving source 401 may be configured to transmit a driving force from the motor 401M by a speed reducer (not shown) provided along with the motor 401M or a speed reducer may be omitted, in this embodiment, the first driving source 401 has a speed reducer.

The first arm 12 and the second arm 13 are connected together through a joint 172. The second arm 13 is rotatable around a second rotating axis O2 as an axial center parallel to a horizontal direction with respect to the first arm 12. The second rotating axis O2 is orthogonal to the first rotating axis O1. The rotation around the second rotating axis O2 is performed by driving of the second driving source 402 having a motor 402M. The second driving source 402 is driven by the motor 402M and a cable (not shown), and the motor 402M is controlled by the robot control device 20 through a motor driver 302 electrically connected to the motor 402M (see FIG. 4). Although the second driving source 402 may be configured to transmit a driving force from the motor 402M by a speed reducer 45 (see FIG. 5) provided along with the motor 402M or a speed reducer may be omitted, in this embodiment, the second driving source 402 has the speed reducer 45. The second rotating axis O2 may be parallel to an axis orthogonal to the first rotating axis O1.

The second arm 13 and the third arm 14 are connected together through a joint 173. The third arm 14 has a third rotating axis O3 parallel to the horizontal direction as a rotation center with respect to the second arm 13, and is rotatable around the third rotating axis O3. The third rotating axis O3 is parallel to the second rotating axis O2. The rotation around the third rotating axis O3 is performed by driving of the third driving source 403. The third driving source 403 is driven by a motor 403M and a cable (not shown), and the motor 403M is controlled by the robot control device 20 through a motor driver 303 electrically connected to the motor 403M (see FIG. 4). Although the third driving source 403 may be configured to transmit a driving force from the motor 403M by a speed reducer (not shown) provided along with the motor 403M or a speed reducer may be omitted, in this embodiment, the third driving source 403 has a speed reducer.

The third arm 14 and the fourth arm 15 are connected together through a joint 174. The fourth arm 15 has a fourth rotating axis O4 parallel to a center axis direction of the third arm 14 as a rotation center with respect to the third arm 14 (base 11), and is rotatable around the fourth rotating axis O4. The fourth rotating axis O4 is orthogonal to the third rotating axis O3. The rotation around the fourth rotating axis O4 is performed by driving of the fourth driving source 404. The fourth driving source 404 is driven by a motor 404M and a cable (not shown), and the motor 404M is controlled by the robot control device 20 through a motor driver 304 electrically connected to the motor 404M (see FIG. 4). Although the fourth driving source 404 may be configured to transmit a driving force from the motor 404M by a speed reducer (not shown) provided along with the motor 404M or a speed reducer may be omitted, in this embodiment, the fourth driving source 404 has a speed reducer. The fourth rotating axis O4 may be parallel to an axis orthogonal to the third rotating axis O3.

The fourth arm 15 and the wrist 16 are connected together through a joint 175. The wrist 16 has a fifth rotating axis O5 parallel to the horizontal direction as a rotation center with respect to the fourth arm 15, and is rotatable around the fifth rotating axis O5. The fifth rotating axis O5 is orthogonal to the fourth rotating axis O4. The rotation around the fifth rotating axis O5 is performed by driving of the fifth driving source 405. The fifth driving source 405 is driven by a motor 405M and a cable (not shown), and the motor 405M is controlled by the robot control device 20 through a motor driver 305 electrically connected to the motor 405M (see FIG. 4). Although the fifth driving source 405 may be configured to transmit a driving force from the motor 405M by a speed reducer (not shown) provided along with the motor 405M or a speed reducer may be omitted, in this embodiment, the fifth driving source 405 has a speed reducer.

The wrist 16 has a sixth rotating axis O6 perpendicular to the fifth rotating axis O5 as a rotation center through a joint 176, and is rotatable around the sixth rotating axis O6. The sixth rotating axis O6 is orthogonal to the fifth rotating axis O5. The rotation around the sixth rotating axis O6 is performed by driving of the sixth driving source 406. The sixth driving source 406 is driven by a motor 406M and a cable (not shown), and the motor 406M is controlled by the robot control device 20 through a motor driver 306 electrically connected to the motor 406M (see FIG. 4). Although the sixth driving source 406 may be configured to transmit a driving force from the motor 406M by a speed reducer (not shown) provided along with the motor 406M or a speed reducer may be omitted, in this embodiment, the sixth driving source 406 has a speed reducer. The fifth rotating axis O5 may be parallel to an axis orthogonal to the fourth rotating axis O4, and the sixth rotating axis O6 may be parallel to an axis orthogonal to the fifth rotating axis O5.

As shown in FIG. 6, the first arm 12 is provided with a first angular velocity sensor 31, that is, a first angular velocity sensor unit 71 having the first angular velocity sensor 31 is provided. The angular velocity around the first rotating axis O1 of the first arm 12 is detected by the first angular velocity sensor 31.

As shown in FIG. 7, the second arm 13 is provided with a second angular velocity sensor 32, that is, a second angular velocity sensor unit 72 having the second angular velocity sensor 32. The angular velocity around the second rotating axis O2 of the second arm 13 is detected by the second angular velocity sensor 32.

As shown in FIG. 8, the third arm 14 is provided with a third angular velocity sensor 33, that is, a third angular velocity sensor unit 73 having the third angular velocity sensor 33. The angular velocity around the third rotating axis O3 of the third arm 14 is detected by the third angular velocity sensor 33. Since the third rotating axis O3 is parallel to the second rotating axis O2, the third angular velocity sensor 33 detects the angular velocity of the third arm 14 including the rotation amount of the second arm 13, that is, the angular velocity around the second rotating axis O2 of the third arm 14, instead of the angular velocity around the third rotating axis O3 of the third arm 14.

In the robot 1, vibration of the first arm 12, the second arm 13, and the third arm 14 is suppressed, thereby suppressing vibration of the entire robot 1. Specifically, the angular velocity sensor is provided in each of the first arm 12, the second arm 13, and the third arm 14, and the actuation of the driving sources 401, 402, and 403 is controlled on the basis of the detection results of the first angular velocity sensor 31, the second angular velocity sensor 32, and the third angular velocity sensor 33. In this way, the angular velocity sensor is provided in each of the arms 12, 13, and 14, whereby it is possible to suppress vibration of the robot 1 more reliably compared to a case where an angular velocity sensor is not provided in at least one of the first arm 12, the second arm 13, and the third arm 14. The angular velocity sensors 31, 32, and 33 can have the same configuration, whereby it is possible to commonize these angular velocity sensors 31, 32, and 33, and to reduce cost.

In the driving sources 401 to 406, a first position sensor 411, a second position sensor 412, a third position sensor 413, a fourth position sensor 414, a fifth position sensor 415, and a sixth position sensor 416 are respectively provided in the motors or the speed reducers. These position sensors are not particularly limited, and for example, an encoder, a rotary encoder, a resolver, a potentiometer, or the like may be used. The rotation angles of the shaft portions of the motors or the speed reducers of the driving sources 401 to 406 are detected by the position sensors 411 to 416. The motors of the driving sources 401 to 406 are not particularly limited, and for example, a servomotor, such as an AC servomotor or a DC servomotor, is preferably used. The respective cables may be inserted into the robot 1.

As shown in FIG. 4, the robot 1 is electrically connected to the robot control device 20. That is, the driving sources 401 to 406, the position sensors 411 to 416, and the angular velocity sensors 31, 32, and 33 are electrically connected to the robot control device 20.

The robot control device 20 can actuate the arms 12 to 15 and the wrist 16 separately, that is, can control the driving sources 401 to 406 through the motor drivers 301 to 306 separately. In this case, the robot control device 20 performs detection by the position sensors 411 to 416, the first angular velocity sensor 31, the second angular velocity sensor 32, and the third angular velocity sensor 33, and controls the driving of the driving sources 401 to 406, for example, the angular velocity, the rotation angle, or the like on the basis of the detection results. A control program is stored in a recording medium embedded in the robot control device 20 in advance.

As shown in FIGS. 1 and 2, if the robot 1 is a vertical articulated robot, the base 11 is a portion which is located on the lowermost side of the vertical articulated robot and is fixed to the floor 101 of the installation space. A fixing method is not particularly limited, and for example, in this embodiment shown in FIGS. 1 and 2, a fixing method by a plurality of bolts 111 is used. A fixing location of the base 11 in the installation space may be a wall or a ceiling of the installation space, instead of the floor.

The base 11 has a hollow base body (housing) 112. The base body 112 can be divided into a cylindrical portion 113 having a cylindrical shape, and a boxlike portion 114 having a boxlike shape which is formed integrally in the outer circumferential portion of the cylindrical portion 113. In the base body 112, for example, the motor 401M or the motor drivers 301 to 306 are stored.

Each of the arms 12 to 15 has a hollow arm body (housing) 2, a driving mechanism 3, and a sealing unit 4. Hereinafter, for convenience of description, the arm body 2, the driving mechanism 3, and the sealing unit 4 of the first arm 12 are respectively referred to as "arm body 2a", "driving mechanism 3a", and "sealing unit 4a", the arm body 2, the driving mechanism 3, and the sealing unit 4 of the second arm 13 are respectively referred to as "arm body 2b", "driving mechanism 3b", and "sealing unit 4b", the arm body 2, the driving mechanism 3, and the sealing unit 4 of the third arm 14 are respectively referred to as "arm body 2c", "driving mechanism 3c", and "sealing unit 4c", and the arm body 2, the driving mechanism 3, and the sealing unit 4 of the fourth arm 15 are respectively referred to as "arm body 2d", "driving mechanism 3d", and "sealing unit 4d".

Each of the joints 171 to 176 has a rotation support mechanism (not shown). The rotation support mechanism is a mechanism which rotatably supports one of two arms connected together with respect to the other arm, a mechanism which rotatably supports one of the base 11 and the first arm 12 connected together with respect to the other, or a mechanism which rotatably supports one of the fourth arm 15 and the wrist 16 connected together with respect to the other. In an example of the fourth arm 15 and the wrist 16 connected together, the rotation support mechanism can rotate the wrist 16 with respect to the fourth arm 15. Each rotation support mechanism has a speed reducer (not shown) which reduces the rotation speed of the corresponding motor at a predetermined reduction ratio, and transmits the driving force to the corresponding arm, a wrist body 161 of the wrist 16, and a support ring 162. As described above, in this embodiment, the speed reducer and the motor are referred to as a driving source.

The first arm 12 is connected to the upper end portion (front end portion) of the base 11 in a posture inclined with respect to the horizontal direction. In the first arm 12, the driving mechanism 3a has the motor 402M and is stored in the arm body 2a. The arm body 2a is sealed airtight by the sealing unit 4a. The arm body 2a has a pair of tongue piece portions 241a and 241b on the front end side, and a root portion 251 on the base end side. The tongue piece portion 241a and the tongue piece portion 241b are separated from each other and opposite to each other. The tongue piece portions 241a and 241b are inclined with respect to the root portion 251, and thus, the first arm 12 is inclined with respect to the horizontal direction. A base end portion of the second arm 13 is arranged between the tongue piece portion 241a and the tongue piece portion 241b.

The installation position of the first angular velocity sensor 31 in the first arm 12 is not particularly limited, and in this embodiment, as shown in FIG. 6, the first angular velocity sensor 31, that is, the first angular velocity sensor unit 71 is provided in an end portion of the root portion 251 of the arm body 2a of the first arm 12 on an opposite side to an internal cable 85. The cable 85 is a cable which supplies power to the motors 401M to 406M of the robot 1. Accordingly, it is possible to prevent the first angular velocity sensor 31 from being affected by noise from the cable 85, and to prevent a below-described circuit unit 713, a wiring, and the first angular velocity sensor 31 of the first angular velocity sensor unit 71 from being short-circuited by the cable 85.

Here, for the driving mechanism 3 and the speed reducer, representatively, the driving mechanism 3 which is provided in the arm body 2a of the first arm 12 and rotates the second arm 13 will be described.

As shown in FIG. 5, the driving mechanism 3 has a first pulley 91 which is connected to the shaft portion of the motor 402M, a second pulley 92 which is arranged to be separated from the first pulley 91, and a belt (timing belt) 93 which is stretched between the first pulley 91 and the second pulley 92. The second pulley 92 and the shaft portion of the second arm 13 are connected together by the speed reducer 45.

The speed reducer 45 is not particularly limited, and for example, a speed reducer having a plurality of gears, a harmonic drive ("Harmonic Drive" is Registered Trademark), or the like may be used.

A main cause for vibration of the arms 12 to 15 and the wrist 16 of the robot 1 is, for example, distortion or deflection of the speed reducer 45, expansion and contraction of the belt 93, deflection of the arms 12 to 15 and the wrist 16, or the like.

The second arm 13 is connected to a front end portion of the first arm 12. In the second arm 13, the driving mechanism 3b has the motor 403M and is stored in the arm body 2b. The arm body 2a is sealed airtight by the sealing unit 4b. The arm body 2b has a pair of tongue piece portions 242a and 242b on the front end side, and a root portion 252 on the base end side. The tongue piece portion 242a and the tongue piece portion 242b are separated from each other and opposite to each other. A base end portion of the third arm 14 is arranged between the tongue piece portion 242a and the tongue piece portion 242b.

The installation position of the second angular velocity sensor 32 in the second arm 13 is not particularly limited, and in this embodiment, the second angular velocity sensor 32 is provided in an end portion of the arm body 2c of the second arm 13 on an opposite side to the internal cable 85. In other words, as shown in FIG. 7, the second angular velocity sensor unit 72 is arranged in the tongue piece portion 242a separated from the tongue piece portion 242b, through which the cable 85 passes. Accordingly, it is possible to prevent the second angular velocity sensor 32 from being affected by noise from the cable 85, and to prevent a circuit unit 723, a wiring, and the second angular velocity sensor 32 of the second angular velocity sensor unit 72 from being short-circuited by the cable 85.

The third arm 14 is connected to a front end portion of the second arm 13. In the third arm 14, the driving mechanism 3c has the motor 404M and is stored in the arm body 2c. The arm body 2c is sealed airtight by the sealing unit 4c. The arm body 2c is constituted by a member corresponding to the root portion 251 of the arm body 2a and the root portion 252 of the arm body 2b.

The installation position of the third angular velocity sensor 33 in the third arm 14 is not particularly limited, and in this embodiment, as shown in FIG. 8, the third angular velocity sensor 33, that is, the third angular velocity sensor unit 73 is provided in an end portion of the arm body 2c of the third arm 14 on an opposite side to the internal cable 85. With this, it is possible to prevent the third angular velocity sensor 33 from being affected by nose from the cable 85, and to prevent the circuit unit 723, the wiring, and the third angular velocity sensor 33 of the third angular velocity sensor unit 73 from being short-circuited by the cable 85.

The fourth arm 15 is connected to a front end portion of the third arm 14 in parallel with the center axis direction. In the fourth arm 15, the driving mechanism 3d has the motors 405M and 406M and is stored in the arm body 2d. The arm body 2d is sealed airtight by the sealing unit 4d. The arm body 2d has a pair of tongue piece portions 244a and 244b on the front end side, and a root portion 254 on the base end side. The tongue piece portion 244a and the tongue piece portion 244b are separated from each other and opposite to each other. The support ring 162 of the wrist 16 is arranged between the tongue piece portion 244a and the tongue piece portion 244b.

The wrist 16 is connected to a front end portion (an end portion on an opposite side to the base 11) of the fourth arm 15. In the wrist 16, for example, a manipulator (not shown) which holds precision equipment, such as a wristwatch, is detachably mounted as a functional unit (end effector) in the front end portion (the end portion on an opposite side to the fourth arm 15). The manipulator is not particularly limited, and for example, a configuration in which a plurality of finger portions are provided may be used. The robot 1 controls the operations of the arms 12 to 15, the wrist 16, and the like while holding the precision equipment with the manipulator, thereby conveying the precision equipment.

The wrist 16 has a cylindrical wrist body (sixth arm) 161, and the ring-shaped support ring (fifth arm) 162 which is constituted separately from the wrist body 161 and is provided in the base end portion of the wrist body 161.

A front end surface 163 of the wrist body 161 is a flat surface, and becomes a mounting surface on which the manipulator is mounted. The wrist body 161 is connected to the driving mechanism 3d of the fourth arm 15 through the joint 176, and rotates around the sixth rotating axis O6 by driving of the motor 406M of the driving mechanism 3d.

The support ring 162 is connected to the driving mechanism 3d of the fourth arm 15 through the joint 175, and rotates around the fifth rotating axis O5 along with the wrist body 161 by driving of the motor 405M of the driving mechanism 3d.

A constituent material of the arm body 2 is not particularly limited, and for example, various metal materials may be used and of these, aluminum or an aluminum alloy is particularly preferably used. If the arm body 2 is a casting which is molded using a mold, aluminum or an aluminum alloy is used as the constituent material of the arm body 2, whereby it is possible to easily perform metallic molding.

A constituent material of each of the base body 112 of the base 11, the wrist body 161 of the wrist 16, and the support ring 162 is not particularly limited, and for example, the same material as the constituent material of the arm body 2 may be used. As a constituent material of the wrist body 161 of the wrist 16, stainless steel is preferably used.

A constituent material of the sealing unit 4 is not particularly limited, and for example, various resin materials and various metal materials may be used. A resin material is used as the constituent material of the sealing unit 4, whereby it is possible to achieve reduction in weight.

Next, the first angular velocity sensor unit 71, the second angular velocity sensor unit 72, and the third angular velocity sensor unit 73 will be described.

As shown in FIG. 9, the first angular velocity sensor unit 71 has a first housing 711, and a circuit board 712 having a wiring and a first angular velocity sensor 31 and a circuit unit 713 electrically connected onto the circuit board 712, which are provided in the first housing 711. In this embodiment, the first housing 711 is made of a sealing material, and the first angular velocity sensor 31, the circuit unit 713, and the circuit board 712 are collectively sealed by the sealing material.

Similarly, the second angular velocity sensor unit 72 has a second housing 721, and a circuit board 722 having a wiring and the second angular velocity sensor 32 and a circuit unit 723 electrically connected onto the circuit board 722, which are provided in the second housing 721. In this embodiment, the second housing 721 is made of a sealing material, and the second angular velocity sensor 32, the circuit unit 723, and the circuit board 722 are collectively sealed by the sealing material.

Similarly, the third angular velocity sensor unit 73 has a third housing 731, and a circuit board 732 having a wiring and the third angular velocity sensor 33 and a circuit unit 733 electrically connected onto the circuit board 732, which are provided in the third housing 731. In this embodiment, the third housing 731 is made of a sealing material, and the third angular velocity sensor 33, the circuit unit 733, and the circuit board 732 are collectively sealed by the sealing material.

In this way, the first angular velocity sensor 31 and the circuit unit 713, the second angular velocity sensor 32 and the circuit unit 723, and the third angular velocity sensor 33 and the circuit unit 733 are packaged, thereby simplifying the configuration.

Since the first angular velocity sensor unit 71, the second angular velocity sensor unit 72, and the third angular velocity sensor unit 73 have the same configuration, hereinafter, the first angular velocity sensor unit 71 will be representatively described, and description of the second angular velocity sensor unit 72 and the third angular velocity sensor unit 73 will be omitted.

The first angular velocity sensor 31 has a gyro element 34 which includes one detection axis. The configuration of the gyro element 34 is not particularly limited, and for example, the following gyro element may be used. Hereinafter, as shown in FIGS. 10, 11A, and 11B, the axes orthogonal to each other are defined as an X axis (second axis), a Y axis (first axis), and a Z axis.

As shown in FIG. 10, the gyro element 34 has a quartz substrate having a base portion 341, a pair of detection vibrating arms 342a and 342b which extend from both sides of the base portion 341 in the Y-axis direction and in opposite directions, a pair of connecting arms 343a and 343b which extend from both sides of the base portion 341 in the X-axis direction and in opposite directions, a pair of driving vibrating arms 344a and 344b which extend from both sides of a front end portion of the connecting arm 343a in the Y-axis direction and in opposite directions, and a pair of driving vibrating arms 344c and 344d which extend from both sides of a front end portion of the connecting arm 343b in the Y-axis direction and in opposite directions, detection electrodes (not shown) which are provided in the respective detection vibrating arms 342a and 342b, and driving electrodes (not shown) which are provided in the respective driving vibrating arms 344a, 344b, 344c, and 344d.

The gyro element 34 is actuated as follows. In FIGS. 11A and 11B, the respective vibrating arms are represented by lines so as to easily express a vibration form.

First, as shown in FIG. 11A, in a state where the angular velocity is not applied to the gyro element 34, a voltage is applied to the driving electrodes to cause bending vibration of the respective driving vibrating arms 344a, 344b, 344c, and 344d in a direction indicated by arrow E. In the bending vibration, a vibration mode indicated by a solid line and a vibration mode indicated by a two-dot-chain line are repeated at a predetermined frequency. At this time, the driving vibrating arms 344*a* and 344*b* and the driving vibrating arms 344*c* and 344*d* vibrate line-symmetrically with respect to the Y axis passing through the center of gravity G.

As shown in FIG. 11B, in a state where the vibration is performed, if an angular velocity ω around the Z axis (detection axis) is applied to the gyro element 34, a Coriolis force in a direction of arrow B acts on the driving vibrating arms 344*a*, 344*b*, 344*c*, and 344*d* and the connecting arms 343*a* and 343*b*, and renewed vibration is excited in these arms. Simultaneously, vibration in a direction of arrow C in response to vibration indicated by arrow B is excited in the detection vibrating arms 342*a* and 342*b*. A signal (voltage) according to strain of the detection vibrating arms 342*a* and 342*b* caused by vibration of the detection vibrating arms 342*a* and 342*b* is output from the detection electrodes.

In the above, the gyro element 34 has been simply described.

The circuit unit 713 has an AD conversion unit which performs AD conversion on the signal output from the first angular velocity sensor 31, that is, converts an analog signal to a digital signal, and a transmitting unit which transmits the converted signal to the robot control device 20.

The appearance of the first housing 711 is a cube. The detection axis of the first angular velocity sensor 31 matches (is aligned with) the normal to the largest surface of the rectangular parallelepiped of the first housing 711. With this, it is possible to recognize the directions of the detection axis of the first angular velocity sensor 31 and the detection axis of the second angular velocity sensor 32 easily and reliably, and to allow the first angular velocity sensor and the second angular velocity sensor 32 to take an appropriate posture easily. In particular, as described above, since the gyro element 34 has a flat shape, and the normal to the plate surface is defined as the detection axis, it becomes easy to allow the detection axis of the first angular velocity sensor 31 to match the normal to the largest surface of the rectangular parallelepiped of the first housing 711. The first angular velocity sensor unit 71 is provided such that a detection axis 31*a* of the first angular velocity sensor 31 is parallel to the first rotating axis O1. The second angular velocity sensor unit 72 is provided such that a detection axis 32*a* of the second angular velocity sensor 32 is parallel to the second rotating axis O2. The third angular velocity sensor unit 73 is provided such that a detection axis 33*a* of the third angular velocity sensor 33 is parallel to the third rotating axis O3.

As shown in FIGS. 6 and 9, the first housing 711 has attachment portions 7111 to be attached to the first arm 12 in four corner portions. In each attachment portion 7111, a hole 7112 into which a screw (fixing member) 81 is inserted is formed.

The first arm 12 has three arm-side attachment portions 121 which are formed integrally with the arm body 2*a* and to which the first angular velocity sensor unit 71 (first housing 711) is attached. Each arm-side attachment portion 121 is constituted by a fulcrum which is formed to protrude toward the arm body 2*a*. The respective arm-side attachment portions 121 are arranged at positions corresponding to the attachment portions 7111 of the first housing 711. In the front end portion of each arm-side attachment portion 121, a threaded bore 122 into which the screw 81 is threaded is formed.

The term "integrally" in the arm-side attachment portions 121 formed integrally with the arm body 2*a* refers to a case where the arm body 2*a* and the arm-side attachment portions 121 are formed simultaneously by, for example, die-casting or the like, instead of forming members separately and bonding the members. The same applies to the term "integrally" in below-described arm-side attachment portions 131 and 141 formed integrally with the arm bodies 2*b* and 2*c*.

When attaching (providing) the first angular velocity sensor unit 71 to the first arm 12, three screws 81 are inserted into the holes 7112 of the first housing 711 and threaded into the threaded bores 122 in the front end portions of the arm-side attachment portions 121 of the first arm 12. With this, the three attachment portions 7111 of the first housing 711 are fixed to the arm-side attachment portions 121 of the first arm 12 by the screws 81. That is, the first angular velocity sensor unit 71 is attached to the arm-side attachment portions 121 of the first arm 12. In this case, there is nothing between the arm-side attachment portions 121 and the first angular velocity sensor unit 71, that is, the first angular velocity sensor unit 71 is directly attached to the arm-side attachment portions 121. With this, it is possible to attach the first angular velocity sensor unit 71 to the first arm 12 reliably, and to allow the first angular velocity sensor unit 71 to rotate integrally with the first arm 12 reliably.

The term "directly" when the first angular velocity sensor unit 71 is directly attached to the arm-side attachment portions 121 refers to a case excluding a case where the first angular velocity sensor unit 71 is attached to an intermediate, such as a separate substrate, and the intermediate is attached to the arm-side attachment portions 121. That is, the term "directly" refers to a case where there is nothing, excluding an adhesive or the like, between the arm-side attachment portions 121 and the first angular velocity sensor unit 71. The same applies to the term "directly" when the second angular velocity sensor unit 72 and the third angular velocity sensor unit 73 are directly attached to arm-side attachment portions 131 and 141.

The screws 81 are conductive and are formed of, for example, various metal materials. If the screws 81 are inserted into the holes 7112 of the first housing 711 and are threaded into the threaded bores 122 in the front end portions of the arm-side attachment portions 121, the screws 81 are electrically connected to the wiring of the circuit board 712 electrically connected to a ground terminal of the circuit unit 713, and the front end portions of the screws 81 are electrically connected to the arm-side attachment portions 121. With this, the ground terminal of the circuit unit 713 is electrically connected to the arm body 2*a* of the first arm 12 through the wiring and the screws 81 and grounded. Accordingly, it is possible to reduce the number of components for grounding and to simplify the configuration.

As shown in FIGS. 7 and 9, the second housing 721 has attachment portions 7211 to be attached to the second arm 13 in four corner portions. In each attachment portion 7211, a hole 7212 into which the screw 81 is inserted is formed.

As shown in FIG. 7, the second arm 13 has the arm-side attachment portions 131 which are formed integrally with the arm body 2*b* and to which the second angular velocity sensor unit 72 (second housing 721) is attached. The arm-side attachment portions 131 are formed integrally with the arm body 2*b*. In each of the corner portions of the arm-side attachment portions 131, a threaded bore into which the screw 81 is threaded is formed.

When attaching the second angular velocity sensor unit 72 to the second arm 13, the four screws 81 are inserted into the holes 7212 of the second housing 721 and threaded into the threaded bores in the front end portions of the arm-side attachment portions 131 of the second arm 13. With this, the four attachment portions 7211 of the second housing 721 are fixed to the arm-side attachment portions 131 of the second arm 13 by the screws 81. That is, the second angular velocity sensor unit 72 is attached to the arm-side attachment portions 131 of the second arm 13. In this case, there is nothing between the arm-side attachment portions 131 and the second angular velocity sensor unit 72, that is, the second angular velocity sensor unit 72 is directly attached to the arm-side attachment portions 131. Accordingly, it is possible to attach the second angular velocity sensor unit 72 to the second arm 13 reliably, and to allow the second angular velocity sensor unit 72 to rotate integrally with the second arm 13 reliably.

If the screws 81 are inserted into the holes 7212 of the second housing 721 and threaded into the threaded bores of the arm-side attachment portions 131, the screws 81 are electrically connected to a wiring of the circuit board 722 electrically connected to a ground terminal of the circuit unit 723, and the front end portions of the screws 81 are electrically connected to the arm-side attachment portions 131. With this, the ground terminal of the circuit unit 723 is electrically connected to the arm body 2b of the second arm through the wiring and the screws 81 and grounded. Accordingly, it is possible to reduce the number of components for grounding and to simplify the configuration.

As shown in FIGS. 8 and 9, the third housing 731 has attachment portions 7311 to be attached to the third arm 14 in four corner portions. In each attachment portion 7311, a hole 7212 into which the screw 81 is inserted is formed.

As shown in FIG. 8, the third arm 14 has an arm-side attachment portion 141 which is formed integrally with the arm body 2c and to which the third angular velocity sensor unit 73 (third housing 731) is attached. The arm-side attachment portion 141 has a shape corresponding to the third housing 731. That is, the arm-side attachment portion 141 has a plate shape, and the shape in plan view is a quadrangular shape, in this embodiment, a rectangular shape. In each corner portion of the arm-side attachment portion 141, a threaded bore into which the screw 81 is threaded is formed.

When attaching the third angular velocity sensor unit 73 to the third arm 14, the four screws 81 are respectively inserted into the holes 7312 of the third housing 731 and threaded into the threaded bores in the front end portion of the arm-side attachment portion 141 of the third arm 14. With this, the four attachment portions 7311 of the third housing 731 are fixed to the arm-side attachment portion 141 of the third arm 14 by the screws 81. That is, the third angular velocity sensor unit 73 is attached to the arm-side attachment portion 141 of the third arm 14. In this case, there is nothing between the arm-side attachment portion 141 and the third angular velocity sensor unit 73, that is, the third angular velocity sensor unit 73 is directly attached to the arm-side attachment portion 141. Accordingly, it is possible to attach the third angular velocity sensor unit 73 to the third arm 14 reliably, and to allow the third angular velocity sensor unit 73 to rotate integrally with the third arm 14 reliably.

If the screws 81 are inserted into the holes 7312 of the third housing 731 and threaded into the threaded bores of the arm-side attachment portion 141, the screws 81 are electrically connected to the wiring of the circuit board 732 electrically connected to a ground terminal of the circuit unit 733, and the front end portions of the screws 81 are electrically connected to the arm-side attachment portion 141. With this, the ground terminal of the circuit unit 733 is electrically connected to the arm body 2c of the third arm 14 through the wiring and the screws 81 and grounded. Accordingly, it is possible to reduce the number of components for grounding and to simplify the configuration.

Next, the configuration of the robot control device 20 will be described referring to FIGS. 4 and 12 to 16.

The robot control device 20 has a receiving unit which receives a first signal output from the first angular velocity sensor 31, a second signal output from the second angular velocity sensor 32, a third signal output from the third angular velocity sensor 33, and the respective signals output from the position sensors 411 to 416, a calculation unit which obtains a vibrational component of the angular velocity of the first arm 12, a vibrational component of the angular velocity of the second arm 13, and a vibrational component of the angular velocity of the third arm 14 on the basis of the first signal, the second signal, and the third signal received by the receiving unit, and a control unit which controls the actuation of the robot 1 on the basis of the vibrational component of the angular velocity of the first arm 12, the vibrational component of the angular velocity of the second arm 13, and the vibrational component of the angular velocity of the third arm 14 obtained by the calculation unit.

Specifically, as shown in FIGS. 4 and 12 to 17, the robot control device 20 has the receiving unit, a first driving source control unit 201 which controls the actuation of the first driving source 401, a second driving source control unit 202 which controls the actuation of the second driving source 402, a third driving source control unit 203 which controls the actuation of the third driving source 403, a fourth driving source control unit 204 which controls the actuation of the fourth driving source 404, a fifth driving source control unit 205 which controls the actuation of the fifth driving source 405, and a sixth driving source control unit 206 which controls the actuation of the sixth driving source 406.

The calculation unit is constituted by a below-described angular velocity calculation unit 561 of the first driving source control unit 201, a subtracter 571, and a below-described angular velocity calculation unit 562 of the second driving source control unit 202, a below-described angular velocity calculation unit 563 of the third driving source control unit 203, and an adder-subtracter 623.

Figure 12:
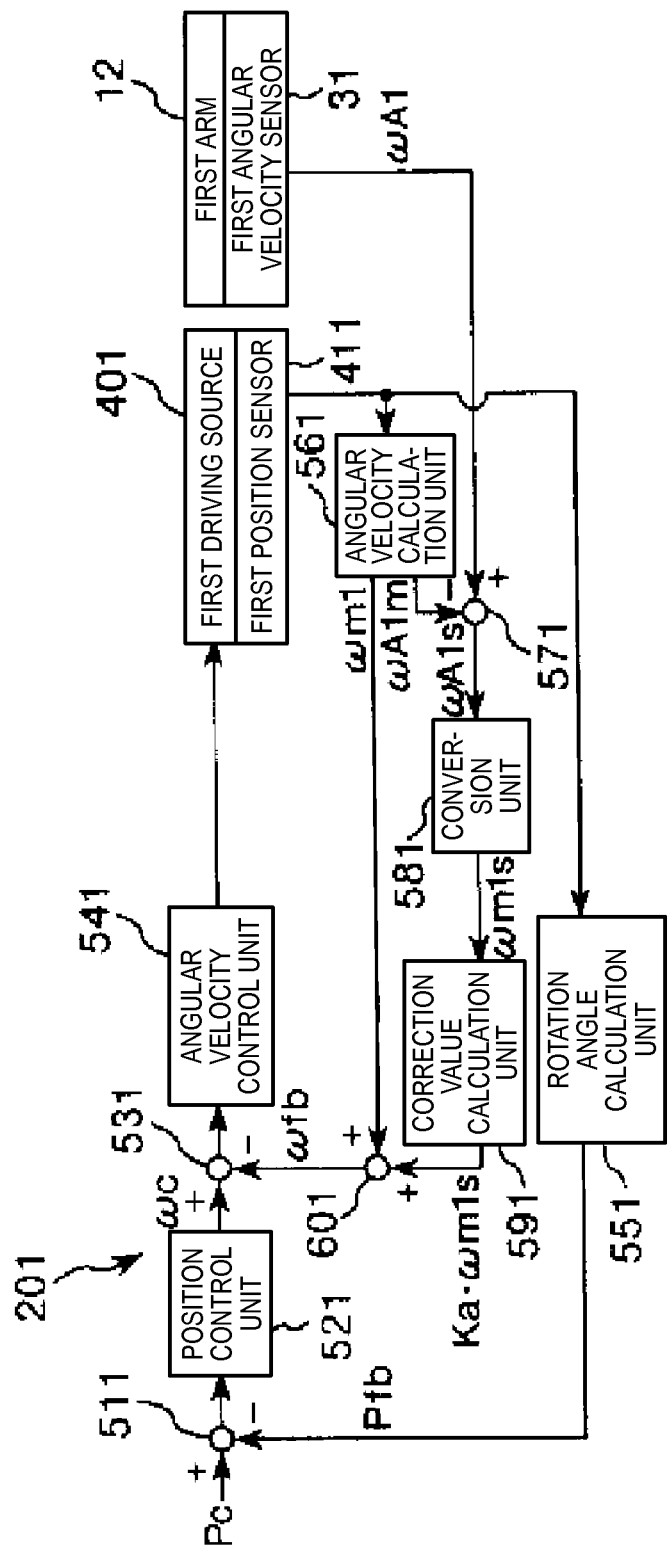
FIG. 12 is a block diagram of a part of the robot shown in FIG. 1.

As shown in FIG. 12, the first driving source control unit 201 has a subtracter 511, a position control unit 521, a subtracter 531, an angular velocity control unit 541, a rotation angle calculation unit 551, an angular velocity calculation unit 561, a subtracter 571, a conversion unit 581, a correction value calculation unit 591, and an adder 601.

Figure 13:
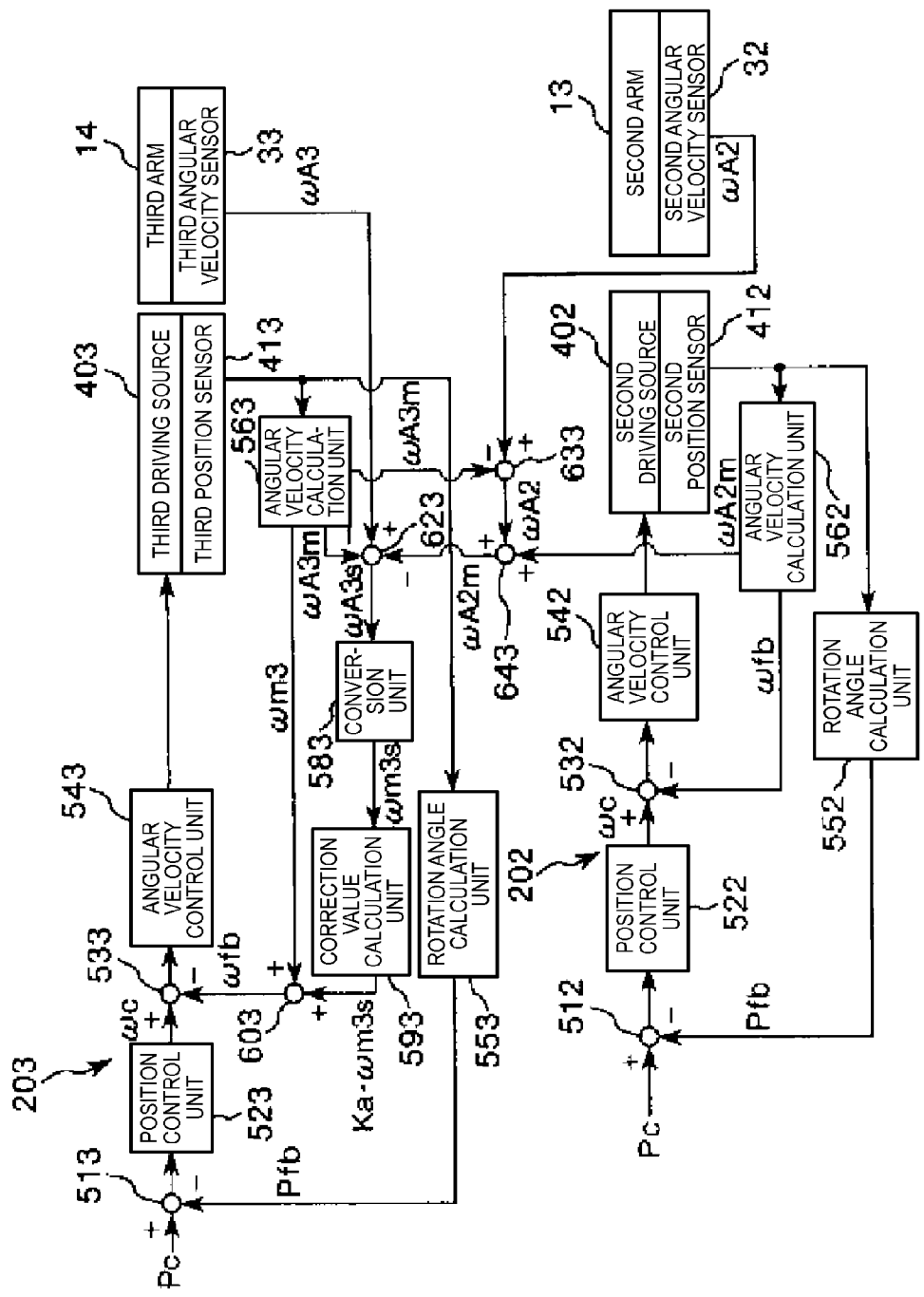
FIG. 13 is a block diagram of a part of the robot shown in FIG. 1.

As shown in FIG. 13, the second driving source control unit 202 has a subtracter 512, a position control unit 522, a subtracter 532, an angular velocity control unit 542, a rotation angle calculation unit 552, and an angular velocity calculation unit 562.

As shown in FIG. 13, the third driving source control unit 203 has a subtracter 513, a position control unit 523, a subtracter 533, an angular velocity control unit 543, a rotation angle calculation unit 553, and an angular velocity calculation unit 563, an adder-subtracter 623, a conversion unit 583, a correction value calculation unit 593, and an adder 603.

Figure 14:
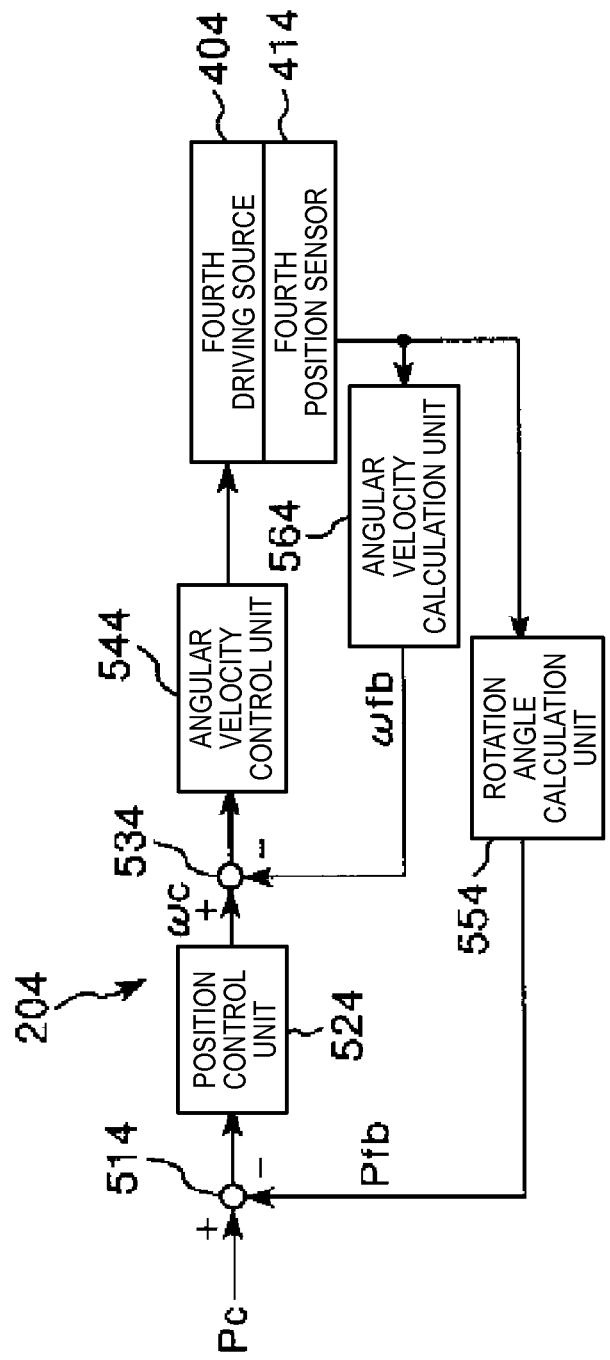
FIG. 14 is a block diagram of a part of the robot shown in FIG. 1.

As shown in FIG. 14, the fourth driving source control unit 204 has a subtracter 514, a position control unit 524, a subtracter 534, an angular velocity control unit 544, a rotation angle calculation unit 554, and an angular velocity calculation unit 564.

Figure 15:
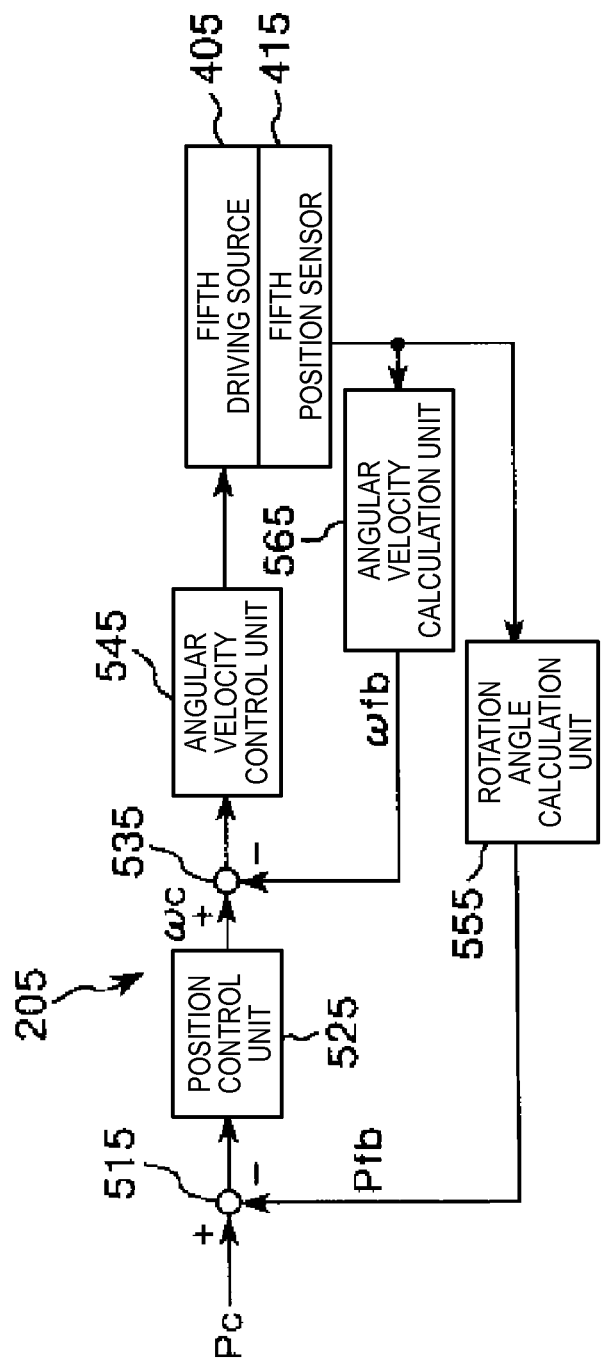
FIG. 15 is a block diagram of a part of the robot shown in FIG. 1.

As shown in FIG. 15, the fifth driving source control unit 205 has a subtracter 515, a position control unit 525, a subtracter 535, an angular velocity control unit 545, a rotation angle calculation unit 555, and an angular velocity calculation unit 565.

Figure 16:
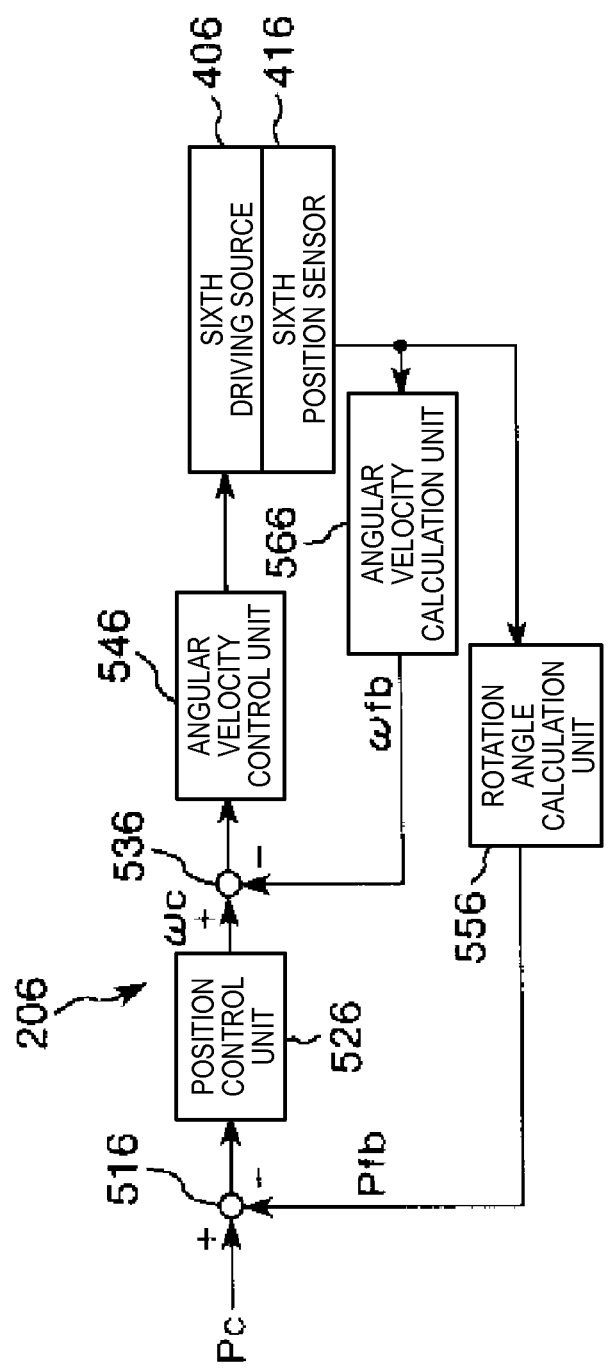
FIG. 16 is a block diagram of a part of the robot shown in FIG. 1.

As shown in FIG. 16, the sixth driving source control unit 206 has a subtracter 516, a position control unit 526, a subtracter 536, an angular velocity control unit 546, a rotation angle calculation unit 556, and an angular velocity calculation unit 566.

Here, the robot control device 20 calculates a target position of the wrist 16 on the basis of the content of processing performed by the robot 1, and produces a track for moving the wrist 16 to the target position. The robot control device 20 measures the rotation angle of each of the driving sources 401 to 406 at every predetermined control period such that the wrist 16 moves along the produced track, and outputs values calculated on the basis of the measurement results to the driving source control units 201 to 206 as a position command Pc of each of the driving sources 401 to 406 (see FIGS. 12 to 16). In the above and following description, the description "the values are input and output" or the like means that "signals corresponding to the values are input and output".

As shown in FIG. 12, in addition to the position command Pc of the first driving source 401, the detection signals from the first position sensor 411 and the first angular velocity sensor 31 are input to the first driving source control unit 201. The first driving source control unit 201 drives the first driving source 401 by feedback control using the respective detection signals such that the rotation angle (position feedback value Pfb) of the first driving source calculated from the detection signal of the first position sensor 411 becomes the position command Pc and a below-described angular velocity feedback value ωfb becomes a below-described angular velocity command ωc.

That is, the position command Pc and a below-described position feedback value Pfb from the rotation angle calculation unit 551 are input to the subtracter 511 of the first driving source control unit 201. In the rotation angle calculation unit 551, the number of pulses input from the first position sensor 411 is counted, and the rotation angle of the first driving source 401 according to the count value is output to the subtracter 511 as the position feedback value Pfb. The subtracter 511 outputs the deviation (the value obtained by subtracting the position feedback value Pfb from a target value of the rotation angle of the first driving source 401) between the position command Pc and the position feedback value Pfb to the position control unit 521.

The position control unit 521 performs predetermined calculation processing using the deviation input from the subtracter 511, and a proportional gain or the like as a preset coefficient, and calculates a target value of the angular velocity of the first driving source 401 according to the deviation. The position control unit 521 outputs a signal representing the target value (command value) of the angular velocity of the first driving source 401 to the subtracter 531 as the angular velocity command ωc. Here, in this embodiment, although proportional control (P control) is performed as feedback control, the invention is not limited thereto.

The angular velocity command ωc and a below-described angular velocity feedback value ωfb are input to the subtracter 531. The subtracter 531 outputs the deviation (the value obtained by subtracting the angular velocity feedback value ωfb from the target value of the angular velocity of the first driving source 401) between the angular velocity command ωc and the angular velocity feedback value ωfb to the angular velocity control unit 541.

The angular velocity control unit 541 performs predetermined calculation processing including integration using the deviation input from the subtracter 531, and a proportional gain, an integral gain, and the like as preset coefficients, produces a driving signal (driving current) of the first driving source 401 according to the deviation, and supplies the driving signal to the motor 401M through the motor driver 301.

Here, in this embodiment, although PI control is performed as feedback control, the invention is not limited thereto.

In this way, the feedback control is performed such that the position feedback value Pfb becomes equal to the position command Pc as much as possible and the angular velocity feedback value ωfb becomes equal to the angular velocity command ωe as much as possible, and the driving current of the first driving source 401 is controlled.

Next, the angular velocity feedback value ωfb in the first driving source control unit 201 will be described.

In the angular velocity calculation unit 561, an angular velocity ωm1 of the first driving source 401 is calculated on the basis of the frequency of a pulse signal input from the first position sensor 411, and the angular velocity ωm1 is output to the adder 601.

In the angular velocity calculation unit 561, an angular velocity ωA1m around the first rotating axis O1 of the first arm 12 is calculated on the basis of the frequency of the pulse signal input from the first position sensor 411, and the angular velocity ωA1m is output to the subtracter 571. The angular velocity ωA1m is a value obtained by dividing the angular velocity ωm1 by a reduction ratio between the motor 401M of the first driving source 401 and the first arm 12, that is, in the joint 171.

The angular velocity around the first rotating axis O1 of the first arm 12 is detected by the first angular velocity sensor 31. The detection signal of the first angular velocity sensor 31, that is, the angular velocity ωA1 around the first rotating axis O1 of the first arm 12 detected by the first angular velocity sensor 31 is output to the subtracter 571.

The angular velocity ωA1 and the angular velocity ωA1m are input to the subtracter 571, and the subtracter 571 outputs a value ωA1s (=ωA1−ωA1m) obtained by subtracting the angular velocity ωA1m from the angular velocity ωA1 to the conversion unit 581. The value ωA1s corresponds to a vibrational component (vibrational angular velocity) of the angular velocity around the first rotating axis O1 of the first arm 12. Hereinafter, ωA1s is referred to as a vibrational angular velocity. In this embodiment, feedback control is performed to return a below-described gain Ka multiple of the vibrational angular velocity ωA1s (in detail, an angular velocity ωm1s in the motor 401M which is a value produced on the basis of the vibrational angular velocity ωA1s) to the input side of the first driving source 401. Specifically, the feedback control is performed on the first driving source 401 such that the vibrational angular velocity ωA1s becomes 0 as much as possible. Accordingly, it is possible to suppress vibration of the robot 1. In the feedback control, the angular velocity of the first driving source 401 is controlled.

The conversion unit 581 converts the vibrational angular velocity ωA1s to the angular velocity ωm1s in the first driving source 401, and outputs the angular velocity ωm1s to the correction value calculation unit 591. The conversion can be performed by multiplying the vibrational angular velocity ωA1s by a reduction ratio between the motor 401M of the first driving source 401 and the first arm 12, that is, in the joint 171.

The correction value calculation unit 591 multiplies the angular velocity ωm1s by the gain (feedback gain) Ka as a preset coefficient, obtains a correction value Ka·ωm1s, and outputs the correction value Ka·ωm1s to the adder 601.

The angular velocity ωm1 and the correction value Ka·ωm1s are input to the adder 601. The adder 601 outputs the sum of the angular velocity ωm1 and the correction value Ka·ωm1s to the subtracter 531 as the angular velocity feedback value ωfb. A subsequent operation is as described above.

As shown in FIG. 13, in addition to the position command Pc of the second driving source 402, the detection signal from the second position sensor 412 is input to the second driving source control unit 202. The second driving source control unit 202 drives the second driving source 402 by feedback control using the respective detection signals such that the rotation angle (position feedback value Pfb) of the second driving source 402 calculated from the detection signal of the second position sensor 412 becomes the position command Pc and a below-described angular velocity feedback value ωfb becomes a below-described angular velocity command ωc.

That is, the position command Pc and a below-described position feedback value Pfb from the rotation angle calculation unit 552 are input to the subtracter 512 of the second driving source control unit 202. In the rotation angle calculation unit 552, the number of pulses input from the second position sensor 412 is counted, and the rotation angle of the second driving source 402 according to the count value is output to the subtracter 512 as the position feedback value Pfb. The subtracter 512 outputs the deviation (the value obtained by subtracting the position feedback value Pfb from a target value of the rotation angle of the second driving source 402) between the position command Pc and the position feedback value Pfb to the position control unit 522.

The position control unit 522 performs predetermined calculation processing using the deviation input from the subtracter 512, and a proportional gain or the like as a preset coefficient, and calculates the target value of the angular velocity of the second driving source 402 according to the deviation. The position control unit 522 outputs a signal representing the target value (command value) of the angular velocity of the second driving source 402 to the subtracter 532 as the angular velocity command ωc. Here, in this embodiment, although proportional control (P control) is performed as feedback control, the invention is not limited thereto.

In the angular velocity calculation unit 562, the angular velocity of the second driving source 402 is calculated on the basis of the frequency of a pulse signal input from the second position sensor 412, and the angular velocity is output to the subtracter 532 as the angular velocity feedback value ωfb.

The angular velocity command ωc and the angular velocity feedback value ωfb are input to the subtracter 532. The subtracter 532 outputs the deviation (the value obtained by subtracting the angular velocity feedback value ωfb from the target value of the angular velocity of the second driving source 402) between the angular velocity command ωc and the angular velocity feedback value ωfb to the angular velocity control unit 542.

The angular velocity control unit 542 performs predetermined calculation processing including integration using the deviation input from the subtracter 532, and a proportional gain, an integral gain, and the like as preset coefficients, produces a driving signal (driving current) of the second driving source 402 according to the deviation, and supplies the driving signal to the motor 402M through the motor driver 302. Here, in this embodiment, although PI control is performed as feedback control, the invention is not limited thereto.

In this way, the feedback control is performed such that the position feedback value Pfb becomes equal to the position command Pc as much as possible and the angular velocity feedback value ωfb becomes equal to the angular velocity command ωc as much as possible, and the driving current of the second driving source 402 is controlled.

As shown in FIG. 13, in addition to the position command Pc of the third driving source 403, the detection signals from the third position sensor 413 and the third angular velocity sensor 33 are input to the third driving source control unit 203.

An angular velocity ωA2m' around the second rotating axis O2 of the second arm 13 is input from the second driving source control unit 202 to the third driving source control unit 203.

The third driving source control unit 203 drives the third driving source 403 by feedback control using the respective detection signals such that the rotation angle (position feedback value Pfb) of the third driving source 403 calculated from the detection signal of the third position sensor 413 becomes the position command Pc and the below-described angular velocity feedback value ωfb becomes a below-described angular velocity command ωc.

That is, the position command Pc and a below-described position feedback value Pfb from the rotation angle calculation unit 553 are input to the subtracter 513 of the third driving source control unit 203. In the rotation angle calculation unit 553, the number of pulses input from the third position sensor 413 is counted, and the rotation angle of the third driving source 403 according to the count value is output to the subtracter 513 as the position feedback value Pfb. The subtracter 513 outputs the deviation (the value obtained by subtracting the position feedback value Pfb from a target value of the rotation angle of the third driving source 403) between the position command Pc and the position feedback value Pfb to the position control unit 523.

The position control unit 523 performs predetermined calculation processing using the deviation input from the subtracter 513, and a proportional gain or the like as a preset coefficient, and calculates a target value of the angular velocity of the third driving source 403 according to the deviation. The position control unit 523 outputs a signal representing the target value (command value) of the angular velocity of the third driving source 403 to the subtracter 533 as the angular velocity command ωc. Here, in this embodiment, although proportional control (P control) is performed as feedback control, the invention is not limited thereto.

The angular velocity command ωc and the below-described angular velocity feedback value ωfb are input to the subtracter 533. The subtracter 533 outputs the deviation (the value obtained by subtracting the angular velocity feedback value ωfb from the target value of the angular velocity of the third driving source 403) between the angular velocity command ωc and the angular velocity feedback value ωfb to the angular velocity control unit 543.

The angular velocity control unit 543 performs predetermined calculation processing including integration using the deviation input from the subtracter 533, and a proportional gain, an integral gain, and the like as preset coefficients, produces a driving signal (driving current) of the third driving source 403 according to the deviation, and supplies the driving signal to the motor 403M through the motor driver 303. Here, in this embodiment, although PI control is performed as feedback control, the invention is not limited thereto.

In this way, the feedback control is performed such that the position feedback value Pfb becomes equal to the position command Pc as much as possible and the angular velocity feedback value ωfb becomes equal to the angular velocity command ωe as much as possible, and the driving current of the third driving source 403 is controlled. Since the third rotating axis O3 is orthogonal to the first rotating axis O1, it is possible to control the actuation of the third driving source 403 separately from the third driving source 403 without being affected by operation or vibration of the first arm 12.

Next, the angular velocity feedback value ωfb in the third driving source control unit 203 will be described.

In the angular velocity calculation unit 563, the angular velocity ωm3 of the third driving source 403 is calculated on the basis of the frequency of a pulse signal input from the third position sensor 413, and the angular velocity ωm3 is output to the adder 603.

In the angular velocity calculation unit 563, the angular velocity ωA3m around the third rotating axis O3 of the third arm 14 is calculated on the basis of the frequency of a pulse signal input from the third position sensor 413, and the angular velocity ωA3m is output to the adder-subtracter 623 and the subtracter 633. The angular velocity ωA3m is a value obtained by dividing the angular velocity ωm3 by a reduction ratio between the motor 403M of the third driving source 403 and the third arm 14, that is, in the joint 173.

The angular velocity around the second rotating axis O2 of the second arm 13 is detected by the second angular velocity sensor 32. The detection signal of the second angular velocity sensor 32, that is, the angular velocity ωA2 around the second rotating axis O2 of the second arm 13 is detected by the second angular velocity sensor 32 is output to the subtracter 633. Since the second rotating axis O2 is orthogonal to the first rotating axis O1, it is possible to obtain the angular velocity around the second rotating axis O2 of the second arm 13 easily and reliably without being affected by operation or vibration of the first arm 12.

The angular velocity ωA3m and the angular velocity ωA2 are input to the subtracter 633, and the subtracter 633 outputs a value ωA2' (=ωA2−ωA3m) obtained by subtracting the angular velocity ωA3m from the angular velocity ωA2 to the adder 643. The angular velocity ωA2' and the angular velocity ωA2m are input to the adder 643, and the adder 643 outputs a value ωA2m' (=ωA2'+ωA2m) obtained by adding the angular velocities ωA2' and ωA2m to the adder-subtracter 623.

The angular velocity around the third rotating axis O3 of the third arm 14 is detected by the third angular velocity sensor 33. The detection signal of the third angular velocity sensor 33, that is, the angular velocity ωA3 around the third rotating axis O3 of the third arm 14 detected by the third angular velocity sensor 33 is output to the adder-subtracter 623. Since the third rotating axis O3 is orthogonal to the first rotating axis O1, it is possible to obtain the angular velocity around the third rotating axis O3 of the third arm 14 easily and reliably without being affected by operation or vibration of the first arm 12.

The angular velocity ωA3, the angular velocity ωA2m', and the angular velocity ωA3m are input to the adder-subtracter 623, and the adder-subtracter 623 outputs a value ωA2s (=ωA3−WA2m'−ωA3m) obtained by subtracting the angular velocity WA2m' and the angular velocity ωA3m from the angular velocity ωA3 to the conversion unit 583. The value ωA3s corresponds to the vibrational component (vibrational angular velocity) of the angular velocity around the third rotating axis O3 of the third arm 14. Hereinafter, ωA3s is referred to as a vibrational angular velocity. In this embodiment, feedback control is performed to return a below-described gain Ka multiple of the vibrational angular velocity ωA3s (in detail, an angular velocity ωm3s in the motor 403M which is a value produced on the basis of the vibrational angular velocity ωA3s) to the input side of the third driving source 403. Specifically, the feedback control is performed on the third driving source 403 such that the vibrational angular velocity ωA3s becomes close to 0 as much as possible. Accordingly, it is possible to suppress vibration of the robot 1. In the feedback control, the angular velocity of the third driving source 403 is controlled.

The conversion unit 583 converts the vibrational angular velocity ωA3s to the angular velocity ωm3s in the third driving source 403, and outputs the angular velocity ωm3s to the correction value calculation unit 593. The conversion can be made by multiplying the vibrational angular velocity ωA3s by the reduction ratio between the motor 403M of the third driving source 403 and the third arm 14, that is, in the joint 173.

The correction value calculation unit 593 multiplies the angular velocity ωm3s by the gain (feedback gain) Ka as a preset coefficient, obtains a correction value Ka·ωm3s, and outputs the correction value Ka·ωm3s to the adder 603. The gain Ka in the third driving source control unit 203 and the gain Ka in the first driving source control unit 201 may be the same or may be different from each other.

The angular velocity ωm3 and the correction value Ka·ωm3s are input to the adder 603. The adder 603 outputs the sum of the angular velocity ωm3 and the correction value Ka·ωm3s to the subtracter 533 as the angular velocity feedback value ωfb. A subsequent operation is as described above.

The driving source control units 204 to 206 are the same as the second driving source control unit 202, and thus, description thereof will not be repeated.

As described above, in the robot 1 and the robot system 10, the angular velocity of the first arm 12 can be detected by the first angular velocity sensor 31, the angular velocity of the second arm 13 can be detected by the second angular velocity sensor 32, and the angular velocity of the third arm 14 can be detected by the third angular velocity sensor 33. Then, it is possible to suppress vibration on the basis of these detection results.

Even if the posture of the robot 1 changes, the detection axis of the first angular velocity sensor 31 is constant. For this reason, it is not necessary to correct the angular velocity of the first arm 12 detected by the first angular velocity sensor 31 with the direction of the first angular velocity sensor 31.

Since the second rotating axis O2 is orthogonal to the first rotating axis O1 or is parallel to an axis orthogonal to the first rotating axis O1, even if the posture of the robot 1 changes, for example, even if the first arm 12 rotates, the detection axis of the second angular velocity sensor 32 is constant. For this reason, it is not necessary to correct the angular velocity of the second arm 13 detected by the second angular velocity sensor 32 with the direction of the second angular velocity sensor 32.

Since the third rotating axis O3 is orthogonal to the first rotating axis O1 or is parallel to an axis orthogonal to the first rotating axis O1, and is parallel to the second rotating axis O2, even if the posture of the robot 1 changes, for example, even if the first arm 12 rotates or the second arm 13 rotates, the detection axis of the third angular velocity sensor 33 is constant. For this reason, it is not necessary to correct the angular velocity of the third arm 14 detected by the third angular velocity sensor 33 with the direction of the third angular velocity sensor 33.

Accordingly, complicated and enormous computation is not required. Therefore, a computation error is less likely to occur, and it is possible to reliably suppress vibration and to increase a response speed in the control of the robot 1.

It is possible to suppress vibration of the robot 1 more reliably compared to a case where an angular velocity sensor is not arranged in at least one of the first arm 12, the second arm 13, and the third arm 14. By communizing the three angular velocity sensors 31, 32, and 33, it is possible to reduce cost.

In the above, the robot 1 of this embodiment has been described.

In the above, although the control method for the robot 1 when the third angular velocity sensor 33 detects the angular velocity around the second rotating axis of the third arm 14 including the rotation amount of the second arm 13, that is, when the second arm 13 and the third arm 14 interfere with each other has been described, if the third angular velocity sensor 33 can substantially detect only the angular velocity of the third arm 14 not including the rotation amount of the second arm 13, the control method for the robot 1 may be the following method.

As shown in FIG. 17, in addition to the position command Pc of the first driving source 401, the detection signals from the first position sensor 411 and the first angular velocity sensor 31 are input to the first driving source control unit 201. The first driving source control unit 201 drives the first driving source 401 by feedback control using the respective detection signals such that the rotation angle (position feedback value Pfb) of the first driving source calculated from the detection signal of the first position sensor 411 becomes the position command Pc and the angular velocity feedback value ωfb becomes the angular velocity command ωc.

As shown in FIG. 18, in addition to the position command Pc of the second driving source 402, the detection signals from the second position sensor 412 and the second angular velocity sensor 32 are input to the second driving source control unit 202. The second driving source control unit 202 drives the second driving source 402 by feedback control using the respective detection signals such that the rotation angle (position feedback value Pfb) of the second driving source calculated from the detection signal of the second position sensor 412 becomes the position command Pc and the angular velocity feedback value ωfb becomes the angular velocity command ωc.

As shown in FIG. 19, in addition to the position command Pc of the third driving source 403, the detection signals from the third position sensor 413 and the third angular velocity sensor 33 are input to the third driving source control unit 203. The third driving source control unit 203 drives the third driving source 403 by feedback control using the respective detection signals such that the rotation angle (position feedback value Pfb) of the third driving source calculated from the detection signal of the third position sensor 413 becomes the position command Pc and the angular velocity feedback value ωfb becomes the angular velocity command ωc.

The control of the driving of the driving sources 401, 402, and 403 is the same as the control of the first driving source 401 shown in FIG. 12, and thus, description thereof will not be repeated.

According to this control method, for example, since the gain (feedback gain) Ka can be set separately in the respective arms 12, 13, and 14, it is possible to optimize the gain Ka in each of the arms 12, 13, and 14. For this reason, it is possible to suppress vibration of the robot 1 more reliably.

Although the robot, the robot control device, and the robot system of the invention have been described on the basis of the illustrated embodiment, the invention is not limited to the embodiment, and the configuration of each unit can be substituted with an arbitrary configuration having the same function. Other arbitrary constituent components may be added to the invention.

As the motor of each driving source, in addition to the servomotor, for example, a stepping motor or the like may be used. If a stepping motor is used as the motor, as a position sensor, for example, a position sensor which measures the number of driving pulses input to the stepping motor so as to detect the rotation angle of the motor may be used.

The type of each position sensor or each angular velocity sensor is not particularly limited, and for example, an optical type, a magnetic type, an electromagnetic type, an electrical type, or the like may be used.

In the foregoing embodiment, although the actuation of the second driving source rotating the second arm is controlled on the basis of the detection result of the second angular velocity sensor, the invention is not limited thereto, and for example, the actuation of the third driving source rotating the third arm may be controlled on the basis of the detection result of the second angular velocity sensor.

In the foregoing embodiment, although the number of rotating axes of the robot is six, the invention is not limited thereto, and the number of rotating axes of the robot may be three, four, five, or seven or more.

That is, in the foregoing embodiment, although, since the wrist has two arms, the number of arms of the robot is six, the invention is not limited thereto, and the number of arms of the robot may be three, four, five, or seven or more.

In the foregoing embodiment, although the robot is a single-arm robot which has an arm connector with a plurality of arms rotatably connected together, the invention is not limited thereto, and for example, the robot may be a robot having a plurality of arm connectors, for example, a double-arm robot which has two arm connectors with a plurality of arms rotatably connected together, or the like.

The entire disclosure of Japanese Patent Application No. 2013-082276 filed Apr. 10, 2013 is expressly incorporated by reference herein.

What is claimed is:

1. A robot comprising:
  a base;
  a first arm rotatably connected to the base around a first rotating axis;
  a second arm rotatably connected to the first arm around a second rotating axis, the second axis being orthogonal to the first rotating axis;
  a third arm rotatably connected to the second arm around a third rotating axis, the third axis being parallel to the second rotating axis;
  a first angular velocity sensor provided in the first arm at a joint between the base and the first arm, the first angular velocity sensor having a first angular velocity detection axis that is parallel to the first rotating axis;
  a second angular velocity sensor provided in the second arm at a joint between the first arm and the second arm, the second angular velocity sensor having a second angular velocity detection axis that is parallel to the second rotating axis; and
  a third angular velocity sensor provided in the third arm at a joint between the second arm and the third arm, the third angular velocity sensor having a third angular velocity detection axis that is parallel to the third rotating axis,
  wherein the first rotating axis is aligned with a normal of an installation surface of the base.

2. The robot according to claim 1, further comprising:
  a first angular velocity sensor unit having a first housing, the first housing accommodating the first angular velocity sensor and a first circuit unit therein, the first circuit unit AD converting and transmitting a signal output from the first angular velocity sensor;
  a second angular velocity sensor unit having a second housing, the second housing accommodating the second angular velocity sensor and a second circuit unit therein, the second circuit unit AD converting and transmitting a signal output from the second angular velocity sensor; and
  a third angular velocity sensor unit having a third housing, the third housing accommodating the third angular velocity sensor and a third circuit unit therein, the third circuit unit AD converting and transmitting a signal output from the third angular velocity sensor,
wherein the first angular velocity sensor unit is provided in the first arm, the second angular velocity sensor unit is provided in the second arm, and the third angular velocity sensor unit is provided in the third arm.

3. The robot according to claim 2,
wherein the first housing is a first rectangular parallelepiped,
the second housing is a second rectangular parallelepiped,
the third housing is a third rectangular parallelepiped,
the first angular velocity detection axis is aligned with a normal to a largest surface of the first rectangular parallelepiped,
the second angular velocity detection axis is aligned with a normal to a largest surface of the second rectangular parallelepiped, and
the third angular velocity detection axis is aligned with a normal to a largest surface of the third rectangular parallelepiped.

4. A robot system comprising:
the robot according to claim 3; and
a robot control device which controls actuation of the robot.

5. The robot according to claim 2,
wherein each of the first angular velocity sensor, the second angular velocity sensor, and the third angular velocity sensor includes a gyro element,
each gyro element includes:
 a base,
 a pair of detection vibrating arms which extend from the base parallel to a first axis and in opposite directions,
 a pair of connecting arms which extend from the base parallel to a second axis and in opposite directions, and
 a pair of driving vibrating arms which extend from front ends or a middle of the connecting arms parallel to the first axis and in opposite directions, and
the first axis is orthogonal to the second axis.

6. A robot system comprising:
the robot according to claim 5; and
a robot control device which controls actuation of the robot.

7. The robot according to claim 2,
wherein the first housing has a first attachment portion attached to the first arm, the first attachment portion being in a corner portion of the first housing,
the second housing has a second attachment portion attached to the second arm, the second attachment portion being in a corner portion of the second housing, and
the third housing has a third attachment portion attached to the third arm, the third attachment portion being in a corner portion of the third housing.

8. The robot according to claim 7, further comprising:
a first conductive fixing member fixing the first attachment portion to the first arm and grounding the first circuit unit to the first arm;
a second conductive fixing member fixing the second attachment portion to the second arm and grounding the second circuit unit to the second arm; and
a third conductive fixing member fixing the third attachment portion to the third arm and grounding the third circuit unit to the third arm.

9. A robot system comprising:
the robot according to claim 7; and
a robot control device which controls actuation of the robot.

10. The robot according to claim 2,
wherein the first arm has a housing and an arm-side attachment portion formed integrally with the housing, and
the first angular velocity sensor unit is directly attached to the arm-side attachment portion.

11. The robot according to claim 2,
wherein the second arm has a housing and an arm-side attachment portion formed integrally with the housing, and
the second angular velocity sensor unit is directly attached to the arm-side attachment portion.

12. The robot according to claim 2,
wherein the third arm has a housing and an arm-side attachment portion formed integrally with the housing, and
the third angular velocity sensor unit is directly attached to the arm-side attachment portion.

13. A robot system comprising:
the robot according to claim 2; and
a robot control device which controls actuation of the robot.

14. The robot according to claim 1, further comprising:
a power cable provided in the first arm and adapted to supply power to the robot,
wherein the first angular velocity sensor is arranged in an end portion of the first arm opposite to the cable.

15. The robot according to claim 1, further comprising:
a power cable provided in the second arm and adapted to supply power to the robot,
wherein the second angular velocity sensor is arranged in an end portion of the second arm opposite to the cable.

16. The robot according to claim 1, further comprising:
a power cable provided in the third arm and adapted to supply power to the robot,
wherein the third angular velocity sensor is arranged in an end portion of the third arm on an opposite side to the cable.

17. The robot according to claim 1, further comprising:
a fourth arm rotatably connected to the third arm around a fourth rotating axis, the fourth rotating axis being orthogonal to the third rotating axis;
a fifth arm rotatably connected to the fourth arm around a fifth rotating axis, the fifth rotating axis being orthogonal to the fourth rotating axis; and
a sixth arm rotatably connected to the fifth arm around a sixth rotating axis, the sixth rotating axis being orthogonal to the fifth rotating axis.

18. A robot system comprising:
the robot according to claim 1; and
a robot control device which controls actuation of the robot.

19. A robot control device which controls the actuation of a robot, the robot including a base, a first arm rotatably connected to the base around a first rotating axis, a second arm rotatably connected to the first arm around a second rotating axis orthogonal to the first rotating axis, and a third arm rotatably connected to the second arm around a third rotating axis parallel to the second rotating axis, the robot control device comprising:
a receiver which receives a first signal, a second signal, and a third signal,
 the first signal being output from a first angular velocity sensor provided in the first arm at a joint between the base and the first arm and having a first angular velocity detection axis parallel to the first rotating axis,
 the second signal being output from a second angular velocity sensor provided in the second arm at a joint between the first arm and the second arm and having a second angular velocity detection axis parallel to the second rotating axis, and the third signal being output from a third angular velocity sensor provided in the third arm at a joint between the second arm and the third arm and having a third angular velocity detection axis parallel to the third rotating axis;

a calculator which obtains a first vibrational component of the angular velocity of the first arm, a second vibrational component of the angular velocity of the second arm, and a third vibrational component of the angular velocity of the third arm based on the first signal, the second signal, and the third signal received by the receiver; and a controller which controls actuation of the robot based on the first vibrational component, the second vibrational component, and the third vibrational component obtained by the calculator.

* * * * *